(12) United States Patent
Sang et al.

(10) Patent No.: US 8,772,391 B2
(45) Date of Patent: *Jul. 8, 2014

(54) CO-CURABLE, CONDUCTIVE SURFACING FILMS FOR LIGHTNING STRIKE AND ELECTROMAGNETIC INTERFERENCE SHIELDING OF THERMOSET COMPOSITE MATERIALS

(71) Applicant: Cytec Technology Corp., Wilmington, DE (US)

(72) Inventors: Junjie Jeffrey Sang, Newark, DE (US); Dalip Kumar Kohli, Churchville, MD (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/714,506

(22) Filed: Dec. 14, 2012

(65) Prior Publication Data

US 2013/0101833 A1 Apr. 25, 2013

Related U.S. Application Data

(63) Continuation of application No. 13/468,932, filed on May 10, 2012, now Pat. No. 8,357,740, and a continuation of application No. 12/702,715, filed on Feb. 9, 2010, now Pat. No. 8,178,606.

(60) Provisional application No. 61/152,939, filed on Feb. 16, 2009.

(51) Int. Cl.
    *C09D 5/24* (2006.01)

(52) U.S. Cl.
    USPC ........... 524/403; 428/327; 428/341; 428/221; 156/307.1

(58) Field of Classification Search
    USPC ........................................................ 524/403
    See application file for complete search history.

(56) References Cited

U.S. PATENT DOCUMENTS

| 4,307,003 A | 12/1981 | Niswonger |
| 4,319,920 A | 3/1982 | Ehrreich |
| 4,980,234 A | 12/1990 | Almer et al. |
| 4,983,672 A | 1/1991 | Almer et al. |
| 5,112,687 A | 5/1992 | Frentzel et al. |
| 5,207,950 A | 5/1993 | Ehrreich |
| 5,250,342 A | 10/1993 | Lang et al. |
| 5,997,773 A | 12/1999 | Angelopoulos et al. |
| 2002/0037369 A1 | 3/2002 | Starz et al. |
| 2004/0235984 A1 | 11/2004 | Nicholl et al. |
| 2007/0018315 A1 | 1/2007 | Craig et al. |
| 2007/0131912 A1 | 6/2007 | Simone et al. |
| 2007/0238826 A1 | 10/2007 | Fischer et al. |
| 2008/0188609 A1 | 8/2008 | Agarwal et al. |

FOREIGN PATENT DOCUMENTS

| GB | 2407094 A | 4/2005 |
| JP | H05-239317 A | 9/1993 |
| JP | 2005-277262 A | 10/2005 |
| WO | WO8302244 A1 | 7/1983 |
| WO | 98/39395 | 9/1998 |
| WO | 00/77066 A2 | 12/2000 |
| WO | WO03033567 A1 | 4/2003 |
| WO | WO2004083332 A1 | 9/2004 |
| WO | 2007/127032 A2 | 11/2007 |
| WO | WO2008087467 A1 | 7/2008 |

*Primary Examiner* — Doris Lee
(74) *Attorney, Agent, or Firm* — Thi D. Dang

(57) ABSTRACT

Embodiments of the present disclosure present electrically conductive, thermosetting compositions for use in surfacing films and adhesives. The surfacing films possess enhanced electrical conductivity, comparable to metals, without the use of embedded metal screens or foils. Such surfacing films may be incorporated into composite structures (e.g., prepregs, tapes, and fabrics), for example, by co-curing, as an outermost surface layer. In particular, compositions formed using silver flakes as conductive fillers are found to exhibit very high electrical conductivity. For example, compositions including greater than 45 wt. % silver flake exhibit resistivities less than about 55 mΩ/sq. In this manner, the surfacing films as an outermost conductive layer may provide lighting strike protection (LSP) and electromagnetic interference (EMI) shielding when used in applications such as aircraft components.

12 Claims, 12 Drawing Sheets

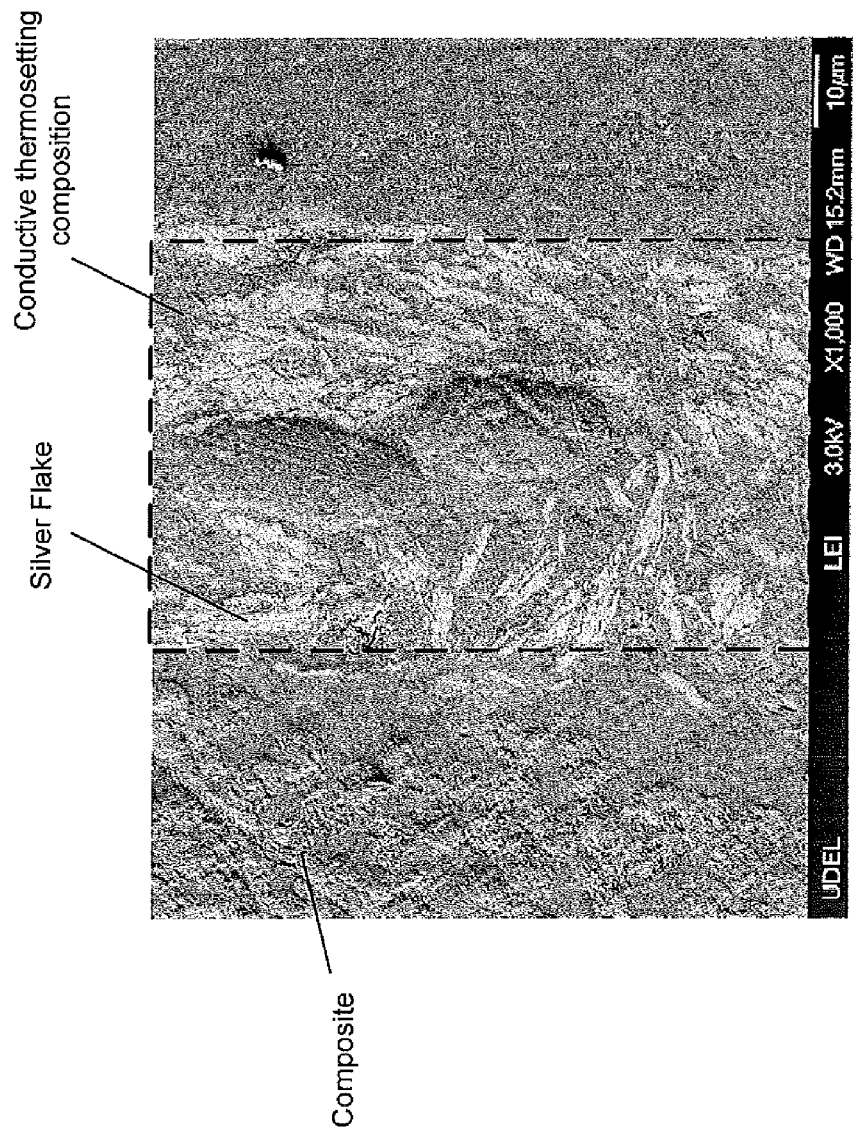

CO-CURABLE, CONDUCTIVE SURFACING FILMS FOR LIGHTNING STRIKE AND ELECTROMAGNETIC INTERFERENCE SHIELDING OF THERMOSET COMPOSITE MATERIALS

CROSS-REFERENCE TO RELATED APPLICATIONS

This application is a continuation application of U.S. application Ser. No. 13/468,932, filed on May 10, 2012, which is a continuation of U.S. application Ser. No. 12/702,715, filed on Feb. 9, 2010, now U.S. Pat. No. 8,178,606, which claims benefit of priority from U.S. Provisional Application No. 61/152,939, filed Feb. 16, 2009.

BACKGROUND

1. Field

Embodiments of the present disclosure pertain to electrically conductive polymer compositions and, in particular, to surfacing and adhesive films formed from thermosetting polymer compositions that incorporate conductive additives.

2. Description of the Related Art

Polymer matrix composite structures (PMCs) are being increasingly used for aerospace applications. For example, PMCs have been employed in amounts up to about 50% in commercial aircraft. PMCs combine selectively oriented fibers that are enveloped in a surrounding polymeric matrix material. These composite structures exhibit good mechanical properties for their weight (e.g., strength, stiffness, toughness), as well as a wide service temperature window and ease of manufacture, making them well suited for aerospace applications.

Surfacing films, such as epoxy-based films, are often incorporated into polymer composites to provide the composites with the surface quality required for aerospace applications. For example, surfacing films may be co-cured with prepregs to provide a substantially porosity free surface that protects the underlying composite, while reducing labor, time, and cost of composite manufacturing.

Epoxy-based surfacing films, however exhibit poor resistance to electromagnetic energy (EME) events, such as lightning strike (LS), electrostatic discharge (ESD), and electromagnetic interference (EMI) due to their insulative properties. The relatively high resistivity exhibited by epoxies inhibits the energy of a lightning strike from dissipating adequately, resulting in skin puncture and delamination of the underlying composite structure. Further, the charge generated on the surface of the composite can remain for long time periods, elevating the risk of ESD in low relative humidity environments that can damage electronic systems and risk sparking in the vapor space of fuel tanks. Additionally, the poor electrical conductivity of epoxy-based surfacing films may inhibit the mobility of charge carriers, which can impair the ability of the composite structure to provide EMI shielding.

To minimize the effect of lightning strike on a composite structure, different ways of enhancing the conductivity of the composite structure have been used to provide LS/ESD/EMI protection for composite parts on aircraft. Examples of such approaches include solid or segmented diverters, arc-sprayed or flame-sprayed metals, woven wire meshes, solid/expanded/perforated foils, metal coated fiber cloths, interwoven wire fabric (IWWF) highly conductive fibers, and metal loaded conductive paints. In further examples, expanded metal screens (e.g., copper, aluminum mesh) have been embedded in surfacing films attached on a composite surface to dissipate the energy incurred by lighting strike for protection against such events.

Detrimentally, however, surfacing film systems with embedded metal screens (e.g., copper or aluminum, with fiberglass isolation layer) significantly increase the overall weight of the aircraft. Furthermore, integrating these surfacing film systems into composite materials may significant increase the materials and labor costs for the manufacture of the composite parts. Additionally, it may be difficult to interconnect these surfacing films in a manner that achieves substantially uniform conductivity across many surfacing films, resulting in conductivity discontinuities that may result in enhanced likelihood of damage during LS or ESD and/or impaired EMI shielding. In particular, metallic screens are further subject to corrosion, thermal expansion mismatch with the matrix that leads to micro-cracking, and impaired bonding with the matrix, each of which may further diminish the LS/ESD/EMI protection afforded by the surfacing film.

SUMMARY

In an embodiment, an electrically conductive surfacing film is provided. The surfacing film comprises
a thermosetting polymer composition comprising:
at least one thermosetting resin; and
at least one conductive additive comprising greater than about 35 wt. % silver flakes, on the basis of the total weight of the composition;
where the resistivity of the surfacing film is less than about 500 m$\Omega$/sq.

In another embodiment, an electrically conductive surfacing film is provided. The surfacing film comprises:
a thermosetting polymer composition comprising:
at least one thermosetting resin; and
about 2-8 wt. % electrically conductive carbon black;
wherein the resistivity of the surfacing film is less than about 50 $\Omega$/sq.

In a further embodiment, a composite comprising the surfacing film is provided.

In an additional embodiment, an electrically conductive composition is provided. The composition comprises:
about 10-60 wt. % of one or more thermosetting resins;
about 0.5-30 wt. % of one or more curing agents; and
about 2-70 wt. % of one or more conductive additives;
where the concentrations are determined on the basis of the total weight of the composition; and
where the concentration of conductive additives is selected such the conductive composition exhibits a resistivity ranging between about $1 \times 10^{-6}$ $\Omega$/sq to $1 \times 10^{8}$ $\Omega$/sq.

In an embodiment, a surfacing film comprising the composition is provided. In another embodiment, a composite comprising the surfacing film is provided. In a further embodiment a conductive adhesive film comprising the composition is provided.

In an additional embodiment, a method of forming a conductive surfacing film is provided. The method comprises:
providing the electrically conductive composition; and
applying the electrically conductive composition to a carrier.

In a further embodiment, a method of forming a composite is provided. In one embodiment, the method comprises co-curing the surfacing film with a composite prepreg. In another embodiment, the method comprises adhering the surfacing film to a composite material.

BRIEF DESCRIPTION OF THE DRAWINGS

FIG. 4A is a scanning electron microscope (SEM) micrographs of a cross-section of a surfacing film including a conductive additive of silver flakes, illustrating a lamellar morphology adopted by the silver flakes;

DETAILED DESCRIPTION

Figure 1:
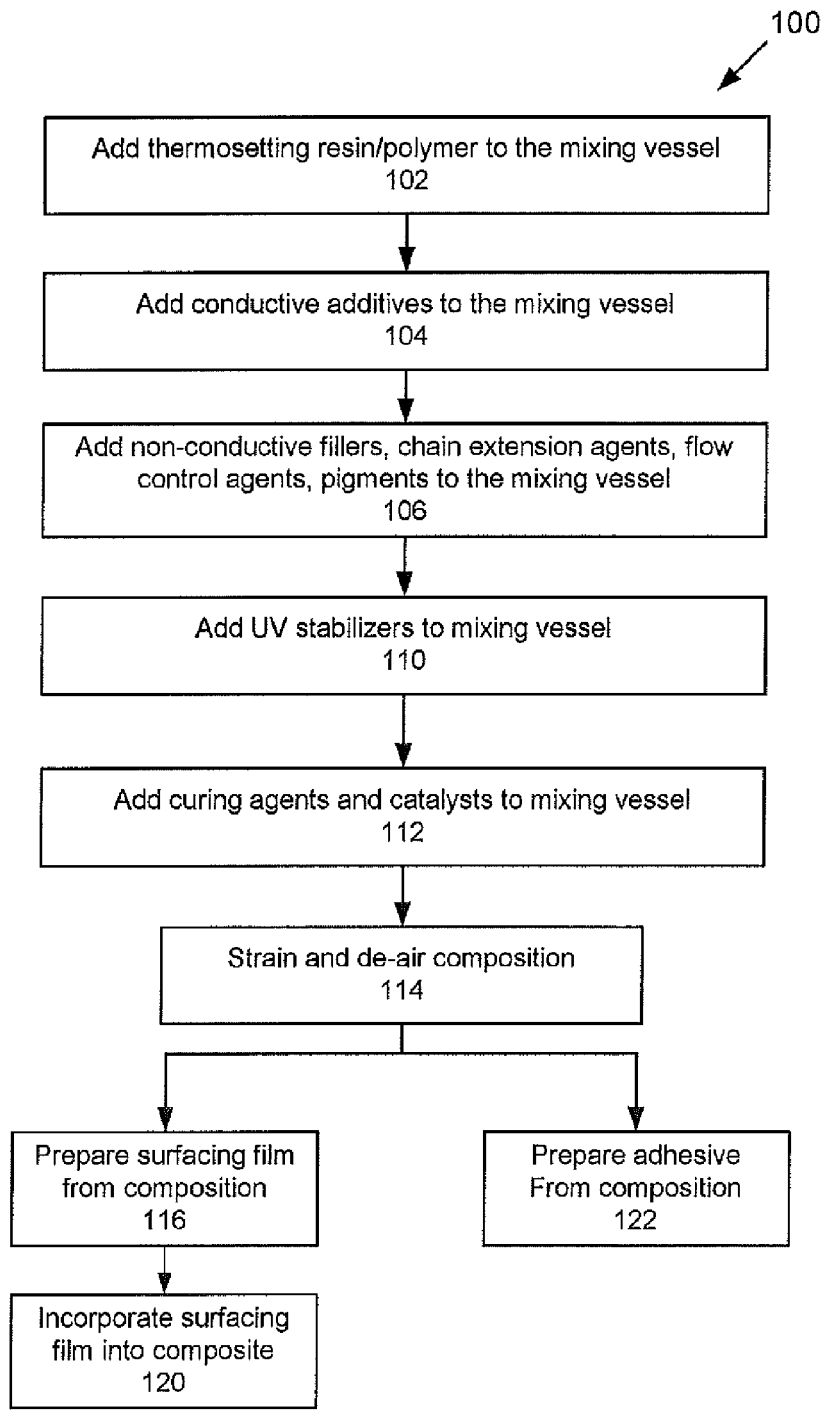
FIG. 1 is a flow diagram of an embodiment of a method of forming electrically conductive, thermosetting compositions and articles therefrom.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

The term "room temperature" as used herein has its ordinary meaning as known to those skilled in the art and may include temperatures within the range of about 16° C. (60° F.) to 32° C. (90° F.).

The term "fiber" as used herein has its ordinary meaning as known to those skilled in the art and may include one or more fibrous materials adapted for the reinforcement of composites. Fibers may take the form of whiskers, short fibers, continuous fibers, filaments, tows, bundles, sheets, plies, and combinations thereof. Continuous fibers may further adopt any of unidirectional, multi-dimensional (e.g., two- or three-dimensional), non-woven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, and less than about 125000 filaments. In further embodiments, the tows may be held in position by cross-tow stitches, weft-insertion knitting stitches, or a small amount of resin, such as a thermoplastic resin.

The composition of the fibers may be varied, as necessary. Embodiments of the fiber composition may include, but are not limited to, glass, carbon, aramid, quartz, polyethylene, polyester, poly-p-phenylene-benzobisoxazole (PBO), boron, polyamide, carbon, and graphite, silicon carbide, silicon nitride, Astroquartz®, Tyranno®, Nextel®, and Nicalon®, and combinations thereof.

The term, "resin" as used herein has its ordinary meaning as known to those skilled in the art and may include one or more compounds comprising thermoset and/or thermoplastic materials. Examples may include, but are not limited to, epoxies, epoxy curing agents, phenolics, phenols, cyanate esters, polyimides (e.g., bismaleimide (BMI) and polyetherimides), polyesters, benzoxazines, polybenzoxazines, polybenzoxazones, polybenzimidazoles, polybenzothiazoles, polyamides, polyamidimides, polysulphones, polyether sulphones, polycarbonates, polyethylene terephthalates, cyanates, cyanate esters, and polyether ketones (e.g. polyether ketone (PEK), polyether ether ketone (PEEK), polyether ketone ketone (PEKK) and the like), combinations thereof, and precursors thereof.

Epoxy resins may further include polyepoxides having at least about two epoxy groups per molecule. The polyepoxides may be saturated, unsaturated, cyclic, or acyclic, aliphatic, alicyclic, aromatic, or heterocyclic. Examples of suitable polyepoxides include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4-hydroxyphenyl)methane), bis(4-hydroxyphenyl)-1,1-isobutane, 4,4'-dihydroxybenzophenone, bis (4-hydroxyphenyl)-1,1-ethane, and 1,5-hydroxynaphthalene. Other suitable polyphenols as the basis for the polyglycidyl ethers are the known condensation products of phenol and formaldehyde or acetaldehyde of the novolak resin-type.

Other polyepoxides may include the polyglycidyl ethers of polyalcohols or diamines. Such polyglycidyl ethers are derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Additional polyepoxides may include polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxides may include those derived from the epoxidation products of olefinically-unsaturated cycloaliphatic compounds or from natural oils and fats.

Other epoxides may include liquid epoxy resins derived by reaction of bisphenol A or bisphenol F and epichlorohydrin. The epoxy resins that are liquid at room temperature generally have epoxy equivalent weights of from 150 to about 480.

Epoxy resins that are solid at room temperature may also, or alternatively, be used and are likewise obtainable from polyphenols and epichlorohydrin, for example, those based on bisphenol A or bisphenol F having a melting point of from 45 to 130° C., preferably from 50 to 80° C. These differ from the liquid epoxy resins substantially by the higher molecular weight thereof, as a result of which they become solid at room temperature. The solid epoxy resins generally have an epoxy equivalent weight of greater than or equal to 400.

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, and exposure to radiation. In certain embodiments, curing may take place within the matrix. Prior to curing, the matrix may further comprise one or more compounds that are, at about room temperature, liquid, semi-solid, crystalline solids, and combinations thereof. In further embodiments, the matrix within a prepreg may be partially cured in order to exhibit a selected stickiness or tack. In certain embodiments, consolidation and curing may be performed in a single process.

The term "consolidation" as used herein has its ordinary meaning as known to those skilled in the art and may include processes in which the resin or matrix material flows so as to displace void space within and adjacent fibers. For example, "consolidation" may include, but is not limited to, flow of matrix into void spaces between and within fibers and prepregs, and the like. "Consolidation" may further take place under the action of one or more of heat, vacuum, and applied pressure.

The term "impregnate" as used herein has its ordinary meaning as known to those skilled in the art and may include the introduction of a matrix material between or adjacent to one or more fibers. The matrix may take the form of films, powders, liquids, and combinations thereof. Impregnation may be facilitated by the application of one or more of heat, pressure, and solvents.

The term "prepreg" as used herein has its ordinary meaning as known to those skilled in the art and may include sheets or lamina of fibers that have been impregnated with a matrix material. The matrix may also be present in a partially cured state.

The terms "layup" and "prepreg layup" as used herein has their ordinary meaning as known to those skilled in the art and may include one or more prepreg layers that are placed adjacent one another. In certain embodiments, the prepreg layers within the layup may be positioned in a selected orientation with respect to one another. For example, prepreg layups may comprise prepreg layers having unidirectional fiber architectures, with the fibers oriented at 0°, 90°, a selected angle θ, and combinations thereof, with respect to the largest dimension of the layup, such as the length. It may be further understood that, in certain embodiments, prepregs having any combination of fiber architectures, such as unidirectional and multi-dimensional, may be combined to form the prepreg layup.

In further embodiments, prepreg layers may optionally be stitched together with a threading material in order to inhibit their relative motion from a selected orientation. Layups may be manufactured by techniques that may include, but are not limited to, hand layup, automated tape layup (ATL), advanced fiber placement (AFP), and filament winding.

Embodiments of the present disclosure present electrically conductive, thermosetting compositions for use in surfacing films and adhesives, as well as corresponding methods of fabrication. The surfacing films formed from the composition possess enhanced electrical conductivity, comparable to metals, without the use of embedded metal screens or foils. Such surfacing films may be incorporated into composite structures (e.g., prepregs, tapes, and fabrics), for example, by co-curing, as an outermost surface layer. In this manner, the surfacing films as an outermost conductive layer may provide lighting strike protection (LSP) and electromagnetic interference (EMI) shielding when used in applications such as aircraft components.

In certain embodiments, the enhanced electrical conductivity of the surfacing films may be achieved by combination of thermosetting polymers with electrically conductive additives, such as metal flakes and/or conductive nanoparticles dispersed substantially uniformly throughout or on the film. Beneficially, these compositions may substantially reduce the need for the use of relatively heavy, metal screens enhance the electrical conductivity of surfacing films, providing substantial reductions in weight. For example, weight savings of about 50 to 80% may be achieved as compared to conductive surfacing films embedded with metal screens. The absence of such screens and foils in embodiments of the surfacing films disclosed herein may further facilitate ease of manufacturing and reduce the cost of composite components formed with these surfacing films.

In particular, it has been discovered that embodiments of polymer compositions comprising conductive additives of silver flake exhibit significantly enhanced conductivity. As discussed below, without being bound by theory, it is believed that, in selected concentrations, for example, greater than about 35 wt. %, the silver flake adopts a substantially interconnected, lamellar configuration throughout the composition. This lamellar configuration provides the surfacing film with a substantially uniform continuous conductive path and relatively high conductivity/low resistivity. For example, surfacing films having resistivity values on the order of about 10 to 50 mΩ/sq in plane may be achieved. The resistivity of these surfacing films may be further lowered to values on the order of about 0.2 to 15 mΩ/sq by the addition of other conductive additives, such as silver nanowires. Notably, these resistivities are comparable to metals such as aluminum (e.g., about 0.2 mΩ/sq), indicating the feasibility of replacing heavy, screen-containing surfacing films surfacing films formed from embodiments of the conductive compositions disclosed herein.

Embodiments of the conductive composition may also be tailored to meet the requirements of various applications by adjusting the type and/or amount of the conductive additives. For example, electrostatic discharge (ESD) protection may be enhanced if the conductive additives are provided in a concentration sufficient to provide the composition with a surface resistivity within the range of approximately 1 Ω/sq to $1 \times 10^8$ Ω/sq. In another example, electromagnetic interference (EMI) shielding protection may be enhanced if the conductive additives are provided in a concentration sufficient to provide the composition with a surface resistivity within the range of approximately $1 \times 10^{-6}$ to $1 \times 10^4$ Ω/sq. In a further example, lighting strike protection (LSP) may be enhanced if the conductive additives are provided in concentration sufficient to provide the composition with a surface resistivity within the range of approximately $1 \times 10^{-6}$ to $1 \times 10^{-3}$ Ω/sq.

In further embodiments, surfacing films may also be incorporated into composites. For example, surfacing films may be incorporated into composites by co-curing with prepregs, such as approximately 250° F. and 350° F. curing prepregs, to provide composite structures having good surface finish and high conductivity. In alternative embodiments, surfacing films may be secondarily bonded with composites that have already been cured at temperatures ranging between about 160° F. and 350° F. Advantageously, this flexibility in manufacturing may allow the surfacing films to be incorporated into composite structures during or after composite fabrication. The cure temperature of embodiments of the surfacing films may also be tailored for low temperatures, out-of-autoclave curing prepregs, within the range of about 140° F. and 360° F. These and other advantages of the disclosed embodiments are discussed in detail below.

FIG. 1 illustrates one embodiment of a method 100 of manufacturing a composite which incorporates a surfacing film comprising an electrically conductive, thermosetting polymer composition. The method 100 includes the operations of adding one or more resins capable of forming a thermosetting polymer to a mixing vessel in block 102, adding one or more conductive additives to the mixing vessel in block 104, adding one or more non-conductive fillers, flow control agents, chain extension agents, and/or pigments to the mixing vessel in block 106, adding one or more UV stabilizers to the mixing vessel in block 110, adding one or more curing agents and/or catalysts for the resins to the mixing vessel in block 112, and straining and de-airing the composition in block 114. The method 100 may further comprise forming the composition into one of a surfacing film in block 116 or adhesive in block 120. The method 100 may further comprise incorporating the surfacing film into a composite in block 122.

As discussed in detail below, in the method 100, the components of the composition may be added to a mixing vessel equipped for mixing, heating, and/or cooling the components. Furthermore, as necessary, one or more solvents may also be added to the mixture to promote mixing of the components. Examples of such solvents may include, but are not limited to, methyl ethyl ketone (MEK), acetone, dimethylacetamide (DMAc), and N-Methylpyrrolidone (NMP). It may be understood that the method 100 may include greater or fewer steps and that the steps of the method 100 may be performed in any order, as necessary.

As illustrated in FIG. 1, the thermosetting resins are added to the mixing vessel in block 102. Embodiments of the thermosetting resins may include, but are not limited to, resins such as those discussed above. In preferred embodiments, the thermosetting resins may include one or more of epoxies, bismaleimides (BMI), cyanate esters, phenolics, benzoxazines, and polyamides. In other embodiments, the thermosetting resin may include diglycidylether of bisphenol A, diglycidylether of terabromo bisphenol A, and teratglycidylether methylenedianiline, 4-glycidyloxy-N,N'-diglycidyaniline, and combinations thereof. The thermosetting resins may further include chain extension agents and tougheners. In an embodiment, the thermosetting resins may be present in a concentration ranging between about 5 to 95 wt. %, on the basis of the total weight of the composition. In other embodiments, the thermosetting resins may be present in a concentration ranging between about 20 to 70 wt. %, Additional thermosetting resins may also be added to the mixing vessel to adjust the tack and drape of the composition. Embodiments of such resins may include, but are not limited to, multi-functional epoxy resins. Examples of di-, and multi-functional epoxy resins may include, but are not limited to, commercially available resins such as those sold under trade names MY 0510, MY 9655, Tactix 721, Epalloy 5000, MX 120, MX 156. The additional epoxy resins may be present in an amount ranging between about 0 to 20 wt. %, on the basis of the total weight of the composition.

After addition of the thermosetting resins or polymers to the mixing vessel, the mixture may be allowed to mix using a high speed shear mixer. Mixing may be performed until the thermosetting resins are mixed substantially uniformly. For example, in one embodiment, mixing may be performed for about 50 to 70 minutes at a speed of about 1000 to 5000 rpm.

In other embodiments, toughening agents may also be added to the composition in block 102 to adjust the film rigidity and surface hardness of the surfacing film. In certain embodiments, the toughening agents may be polymeric or oligomeric in character, have glass transition temperatures below 20° C. (more preferably below 0° C. or below −30° C. or below −50° C.), and/or have functional groups such as epoxy groups, carboxylic acid groups, amino groups and/or hydroxyl groups capable of reacting with the other components of the compositions of the present invention when the composition is cured by heating. In certain embodiment, the toughening agents may comprise elastomeric toughening agents. In other embodiments, the toughening agents may comprise core-shell rubber particles or liquid rubbers. Examples of toughening agents may be found in U.S. Pat. No. 4,980,234, U.S. Patent Application Publication No. 2008/0188609, and International Patent Publication No. WO/2008/087467, the entirety of which is hereby incorporated by reference. The concentration of the toughening agents may range between about 5 to 40 wt. % on the basis of the total weight of the composition. The concentration of the toughening agent may further range between about 1 to 30 wt. %.

Further examples of elastomeric toughening agents may include, but are not limited to, carboxylated nitriles (e.g., Nipol 1472, Zeon Chemical), carboxyl-terminated butadiene acrylonitrile (CTBN), carboxyl-terminated polybutadiene (CTB), polyether sulfone (e.g., KM 180 PES—Cytec), PEEK, PEKK thermoplastic, and core/shell rubber particles (e.g. Kaneka's MX 120, MX 156 and other MX resins with pre-dispersed core/shell rubber nanoparticles).

In block 104, conductive additives may be added to the mixing vessel. Embodiments of the conductive additives may include, but are not limited to, metals and metal alloys, metal-coated particles, surface functionalized metals, conductive veils, non-metals, polymers, and nano-scale materials. The morphology of the conductive additives may include one or more of flakes, powders, particles, fibers, and the like. In an embodiment, the total concentration of all conductive additives may range between about 0.1 to 80 wt. %, on the basis of the total weight of the composition. In alternative embodiments, the concentration of all conductive additives may range between about 0.5 to 70 wt. %.

Metals and their alloys may be employed as effective conductive additives, owing to their relatively high electrical conductivity. Examples of metals and alloys for use with embodiments of the present disclosure may include, but are not limited to, silver, gold, nickel, copper, aluminum, and alloys and mixtures thereof. In certain embodiments, the morphology of the conductive metal additives may include one or more of flakes, powders, fibers, wires, microspheres, and nanospheres, singly or in combination.

In certain embodiments, precious metals, such as gold and silver, may be employed due to their stability (e.g., resistance to oxidation) and effectiveness. In other embodiments, silver may be employed over gold, owing to its lower cost. It may be understood, however, that in systems where silver migration may be problematic, gold may be alternatively employed. Beneficially, as discussed below, it is possible for silver and gold filled epoxies to achieve resistivities less than about 20 mΩ/sq.

In other embodiments, the conductive additives may comprise metal coated particles. Examples of metal-coated particles may include metal coated glass balloons, metal coated graphite, and metal coated fibers. Examples of metals which may be used as substrates or coatings may include, but are not limited to, silver, gold, nickel, copper, aluminum, and mixtures thereof.

In further embodiments, the conductive additives may comprise conductive veils. Examples of such conductive veils may include, but are not limited to, non-woven veils coated with metals, metal screens/foils, carbon mat, or metal coated carbon mat. Examples of metals which may be used as may include, but are not limited to, silver, gold, nickel, copper, aluminum, and mixtures thereof.

Embodiments of non-metals suitable for use as conductive additives with embodiments of the present disclosure may include, but are not limited to, conductive carbon black, graphite, antimony oxide, carbon fiber.

Embodiments of nanomaterials suitable for use as conductive additives with embodiments of the present disclosure may include carbon nanotubes, carbon nanofibers, metal coated carbon nanofibers, metal nanowires, metal nanoparticles, graphite (e.g., graphite nanoplatelets), and nanostrands. In certain embodiments, largest mean dimension of the nanomaterials may be less than 100 nm.

Carbon nanotubes may include single-walled carbon nanotubes (SWNTs), double-walled carbon nanotubes (DNTs), and multi-walled carbon nanotubes (MWNTs). The carbon nanotubes, optionally, may also be surface functionalized. Examples of functional groups that may be employed for functionalization of carbon nanotubes may include, but are not limited to, hydroxy, epoxy, and amine functional groups. Further examples of functionalized carbon nanotubes may include, Nano-In-Resin from Nanoledge, a CNT/epoxy concentrate with CNTs pre-dispersed in an epoxy matrix.

Examples of carbon nanofibers suitable for use as conductive additives with embodiments of the present disclosure may include bare carbon nanofibers (CNF), metal coated CNF, and NanoBlack II (Columbian Chemical, Inc.). Metal coatings may include, but are not limited to, Copper, aluminum, silver, nickel, iron, and alloys thereof.

Examples of nanowires suitable for use as conductive additives with embodiments of the present disclosure may include, but are not limited to, nickel, iron, silver, copper, aluminum and alloys thereof. The length of the nanowires may be greater than about 1 μm, greater than about 5 μm, greater than about 10 μm, and about 10 to 25 nm. The diameter of the nanowires may be greater than about 10 nm, greater than about 40 nm, greater than about 70 nm, greater than about 150 nm, greater than about 300 nm, greater than about 500 nm, greater than about 700 nm, and greater than about 900 nm. Examples of silver nanowires may include SNW-A60, SNW-A90, SNW-A300, and SNW-A900 from Filigree Nanotech, Inc.

In a preferred embodiment, the conductive additive may comprise silver flakes. As discussed in detail below, it has been identified that the use of silver flake, and in particular, silver flake in combination with silver nanowire, significantly enhances the electrical conductivity of thermosetting compositions to levels that are approximately equal to or greater than that of metals. Furthermore, silver flakes may be combined with other conductive additives as discussed herein to further enhance the conductivity of the thermosetting composition. Examples include, but are not limited to, nanowires (e.g., silver nanowire), carbon nanotubes, metal coated glass balloons (e.g., silver-coated glass balloons).

For example, the embodiments of the composition including silver flake may range in resistivity from as low as about 0.2 mΩ/sq at about 63 wt. % loading on the basis of the total weight of the composition (with additions of about 3 wt. % silver nano wires) to greater than about 4500 mΩ/sq at about 18 wt. % with silver flake alone. The ability to tailor the resistivity of the composition within such a broad range is significant, as the loading fraction of conductive additives within the composition may be adjusted for any of ESD, EMI, and LSP applications.

Figure 4B:
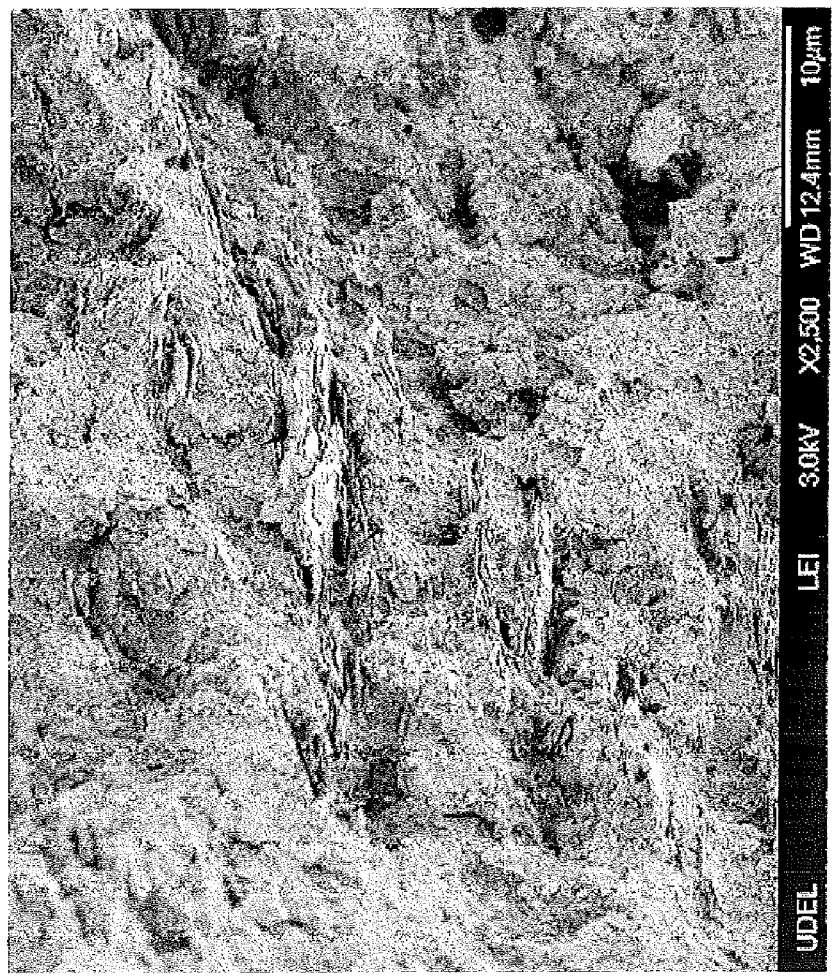
FIG. 4B is an SEM micrograph of a fracture surface of a surfacing film formed from an embodiment of the electrically conductive polymer composition comprising silver flakes.

FIGS. 4A-4B present SEM micrographs examining polished cross-section and fracture surfaces of surfacing films containing embodiments of surfacing films comprising silver flakes (light regions, FIG. 4A) in an epoxy matrix. It may be observed from examination of FIG. 4A that the silver flakes are generally elongate in cross-section, with a high aspect ratio and are substantially uniformly distributed throughout the composition. The silver flakes are furthermore in contact with each other, forming a substantially continuous network. This inter-connected lamellar-like structure was confirmed by examination of surfacing film fracture surfaces (FIG. 4B). This representative micrograph shows silver flakes present at, or protruding outward from, the fracture surface substantially throughout the fracture surface.

In certain embodiments, discussed in detail below in the examples, this lamellar-like morphology may be achieved with silver flake having a mean size of about 3 μm to 36 μm in concentrations greater than about 30 wt. %, for example, about 39 to 65 wt. %. Without being bound by theory, this conductive path is believed to be responsible for the substantially uniform, high conductivity achieved in these conductive surfacing films. The large flake size, up to about 30 μm, and relative large surface area of silver flake provide sufficient surface area contact for continuous, good electrical conductivity throughout the composition in both X-Y and Z directions.

Both the lamellar configuration of the silver flake, and the exceedingly good electrical conductivity were unexpected. The metal-like conductivity assures the good performance of the conductive thermosetting composition for use in applications such as surfacing films for lightning strike protection, as discussed in the examples below.

In block 106, non-conductive fillers may be added to the mixing vessel. In certain embodiments, the largest dimension of the fillers may range between about 12 to 150 μm. The fillers may be further present in an amount ranging between about 0 to 40 wt. % on the basis of the total weight of the composition. In other embodiments, the fillers may be present in a concentration ranging between about 5 to 30 wt. %.

Examples of non-conductive fillers may include ground or precipitated chalks, quartz powder, alumina, dolomite, carbon fibers, glass fibers, polymeric fibers, titanium dioxide, fused silica, carbon black, calcium oxide, calcium magnesium carbonates, barite and, especially, silicate-like fillers of the aluminum magnesium calcium silicate type. Further discussion of fillers may be found in U.S. Pat. No. 4,980,234.

In other embodiments, the non-conducting fillers may include, but are not limited to, ceramic microspheres (e.g., Zeeosheres—3M), glass balloons (e.g., iM30K, A16, H20—3M Corp.; SID-230Z-S2—Emerson & Cummings), and fumed silica. The fillers may be solid and provided in the form of flakes, powders, fibers, microsphere, or glass balloons, and may be solid or hollow structures, as necessary. In one embodiment, the fillers may include ZEESPHERES 200™, hollow, thick walled spheres of a silica-alumina ceramic composition.

Chain extension agents may also be added to the composition to increase the molecular weight of the composition. The concentration of the chain extension agents may range between about 1 to 30 wt. % on the basis of the total weight of the composition. Examples of chain extension agents may include bisphenol A, tetrabromo bisphenol A (TBBA), bisphenol Z, tetramethyl bisphenol A (TMBP-A), and other bisphenol fluorines, as discussed in U.S. Pat. No. 4,983,672.

Pigments may be added to the composition for adjusting the color and appearance of the surfacing film. In an embodiment, pigments may include titanium dioxide, carbon black, black pigment, and other color dyes. The pigments may be provided in the form of flakes, powders, fibers, color concentrate liquid. The total amount of all pigments may range between about 0 to 20 wt. % on the basis of the total weight of the composition.

Flow control agents may also be added to the mixing vessel in block 106. The flow control agents may be employed to modify the rheological properties of the composition. Embodiments of the flow control agents may include, but are not limited to, fumed silica, microspheres, and metallic powders. The flow control agents may be provided in the form of flakes, powders, fibers, spheres, or pellets. The largest dimension of the flow control agents may range between about 0.5 to 10 μm. The flow control agents may be present in an amount ranging between about 0 to 40 wt. %, more preferably, about 0.1 to 10 wt. %, on the basis of the total weight of the composition.

After addition of the conductive additives, as well as any of fillers, pigments, chain extension agents and/or flow control agents to the mixing vessel, the mixture may be allowed to mix in order to substantially distribute these components within the composition. In certain embodiments, mixing may be performed for about 60 to 120 minutes at a speed of about 500 to 5000 rpm. During the mixing process, the temperature of the composition may also be held to less than about 160° F. or below the temperature at which undesirable chemical reactions may occur.

In block 110, UV stabilizers may be optionally added to the mixture. Embodiments of the UV stabilizers may include UV absorbers, antioxidants, pigments, blocking agents, and fillers. Examples of the UV stabilizers may include, but are not limited to, butylated hydroxytoluene (BHT), 2-hydroxy-4-methoxy-benzophenone (UV-9), 2,4-Bis(2,4-dimethylphenyl)-6-(2-hydroxy-4-octyloxyphenyl)-1,3,5-triazine (CYASORB® UV-1164 light absorber), 3,5-Di-tert-butyl-4-hydroxybenzoic acid, n-hexadecyl ester (CYASORB® UV-2908 light stabilizer), titanium dioxide, and carbon black. The UV stabilizers may be provided in the form of solid or liquid. In an embodiment, the UV stabilizers may each be present in an amount ranging between about 0.1 to 5 wt. %, on the basis of the total weight of the composition. In other embodiments, the UV stabilizers may each be present in an amount ranging between about 0.5 to 3 wt. %, on the basis of the total weight of the composition.

After addition of the UV stabilizers modifiers to the mixing vessel, the mixture may be allowed to mix for about 30 to 60 minutes at a speed of about 500 to 2000 rpm. The temperature of the composition may also be held to less than about 160° F.

In block 112, curing agents and, optionally, catalysts may be added to the mixture. In certain embodiments, the curing agents may enable curing of the epoxies of the composition within a temperature range of about 250° F. to 350° F. One or more curing agents may be present in an amount ranging between about 0.1 to 40 wt. %, preferably, about 0.5 to 10 wt. %, on the basis of the total weight of the composition.

Examples of curing agents and catalysts may include, but are not limited to, aliphatic and aromatic primary amines, aliphatic and aromatic tertiary amines, boron trifluoride complexes, guanidines, and dicyandiamide. Additional examples of curing agents and catalysts may be found in U.S. Pat. No. 4,980,234 and U.S. Patent Application Publication No. 2008/0188609.

Further examples of amine curing agents and catalysts may include, but are not limited to, dicyandiamide, Bisureas (e.g., 2,4-Toluene bis-(dimethyl urea), [Omicure U-24 or CA 150], 4,4'-Methylene bis-(phenyl dimethylurea), [Omicure U-52, or CA 152] sold by CVC Chemicals)), and 4,4'-diaminodiphenyl sulfone (4,4-DDS), and $BF_3$.

In certain embodiments, the temperature of composition may be maintained below a selected value during addition of the curing agents and catalysts in order to inhibit resin advancement by premature initiation of catalyst decomposition and reaction with the resin. The selected level may range between about 75 to 150° F., for example, below about 130° F. In other embodiments, shear mixing is performed at a rate ranging between about 500 to 2000 rpm.

Table 1 presents selected embodiments of conductive polymer compositions, as discussed above, for use as surfacing films and adhesives.

TABLE 1

Embodiments of conductive surfacing film and adhesive compositions

| Component | Concentration (parts) | | | | | | |
|---|---|---|---|---|---|---|---|
| | 1 | 2 | 3 | 4 | 5 | 6 | 7 |
| Epoxy Resins | | | | | | | |
| Diglycidylether of Bisphenol A (e.g., DER 331, Epon 828) | 5-15% | 5-15% | 5-50% | 5-50% | 5-50% | | 5-30% |
| Tetraglycidylether methylenedianiline (e.g., MY 9655, 9634, 721) | | 1-5% | | 2-10% | | | 5-15% |
| Diglycidylether of Tetrabromo Bis A (e.g., DER 542) | 5-15% | 5-15% | 5-15% | | | | |
| MY 0510, MX 120, Epalloy 5000 | | | | 5-15% | | 10-60% | |
| Toughening Agent | | | | | | | |
| Nipol 1472 elastomer | 0.5-5% | 0.5-5% | | | | 0.5-5% | 0.5-5% |
| CTBN or CTB elastomer | 0.5-5% | 0.5-5% | | | | 0.5-5% | 0.5-5% |
| KM 180 PES polymer | | | 0.5-5% | 0.5-5% | | | 0.5-8% |
| Chain extension agents | | | | | | | |
| Bisphenol A | 0.5-5% | 0.5-5% | 0.5-5% | | | | |
| Tetrabromo Bisphenol A (TBBA) | | | | | | | |

TABLE 1-continued

Embodiments of conductive surfacing film and adhesive compositions

| Component | Concentration (parts) | | | | | | |
|---|---|---|---|---|---|---|---|
| | 1 | 2 | 3 | 4 | 5 | 6 | 7 |
| Bisphenol Z | | | | | | | |
| Tetramethyl Bisphenol A (TMBP-A) | | | | | | | |
| Curing agents | | | | | | | |
| Bisureas (CA 150 or CA 152) | 0.5-3% | 0.5-3% | 0.5-3% | | | 0.5-3% | 0.5-3% |
| BF$_3$ | | | | | 0.5-1% | | |
| Dicy | 0.5-5% | 0.5-5% | 0.5-5% | | | 0.5-5% | 0.5-5% |
| 4,4-DDS | | | | 5-30% | 5-30% | | |
| Fillers | | | | | | | |
| Ceramic microsphere (e.g. Zeeospheres) | 5-15% | 5-15% | 5-15% | 5-15% | 5-15% | 5-15% | 5-15% |
| Flow control agents | | | | | | | |
| Fumed silica | 0.5-5% | 0.5-5% | 0.5-5% | 0.5-5% | 0.5-5% | 0.5-5% | 0.5-5% |
| UV stabilizers additives | | | | | | | |
| Butylated Hydroxytoluene (BHT) | 0.5-3% | 0.5-3% | 0.5-3% | 0.5-3% | 0.5-3% | 0.5-3% | 0.5-3% |
| 2-hydroxy-4-methoxy-benzophenone (UV-9) | 0.5-3% | 0.5-3% | 0.5-3% | 0.5-3% | 0.5-3% | 0.5-3% | 0.5-3% |
| Conductive Fillers (various types) | | | | | | | |
| Concentration Range 1 | 35-70% | 35-70% | 35-70% | 35-70% | 35-70% | 35-70% | 35-70% |
| Concentration Range 2 | 15-65% | 15-65% | 15-65% | 15-65% | 15-65% | 15-65% | 15-65% |
| Concentration Range 3 | 1-20% | 1-20% | 1-20% | 1-20% | 1-20% | 1-20% | 1-20% |

In block 114, the composition may be readied for use. In one embodiment, the composition may be strained so as to filter out any impurities and outsized particulates within the composition. In certain embodiments, the composition may be filtered through a mesh having selected aperture dimension so as to remove foreign debris and outsized particulates from the composition.

In further embodiments, the composition may be de-aired under vacuum in order to substantially removing air bubbles that may be incorporated within the bulk of the composition. In an embodiment, a vacuum of about 26 to 30 inches of mercury may be exerted on the composition. It may be understood that a selected portion of the volatile content of the composition may also be removed during the de-airing process. In certain embodiments, de-airing may be performed such that the de-aired composition has a solid content of about 55 to 100 wt. %, on the basis of the total volume of the composition.

The prepared composition may be subsequently employed for a variety of applications. Non-limiting examples may include surfacing films (block 116), composites incorporating surfacing films (block 120), and adhesives (block 122).

In block 114, the composition may subsequently be formed into a surfacing film. In certain embodiments, the composition may be coated as a film using a hot-melt coating or solvated film coating processes. The resulting film may have a film weight ranging between about 0.01 to 0.15 psf, for example, about 0.035 psf.

Embodiments of the surfacing film may be further applied to a supporting structure, such as a carrier to facilitate handling of the surfacing film. Examples of supporting structures may include metallic screens or foils, non-woven mats, random mats, knit carriers, metal coated carbon veils, and the like. The geometry of the supporting structure may be varied, as necessary. For example, the thickness of the carriers may range between about 0.5 to 5 mil. Other parameters regarding the carriers, such as number of openings per unit area, strand width, and patterning may also be varied, as necessary.

Examples of metallic screens or foils may include expanded metallic screens or foils, and metal coated veils. Such screens and foils may comprise copper, aluminum, silver, nickel, and alloys thereof.

Examples of non-woven mat carriers may include carbon mats, polymer mats, and metal coated carbon, glass, or polymer glass veils. The non-woven mat carriers may be coated with copper, aluminum, silver, nickel, and alloys, and alloys thereof.

The film so formed may then be dried to remove volatiles. In certain embodiments, the volatile content of the film may range between about 0.1 to 0.99 wt. %, on the basis of the total weight of the film. For example, the volatile content of the surfacing film after drying may be less than about 1 wt. %.

The surfacing film so formed may also be stored until needed. For example, the surfacing film may be stored in cold storage in order to inhibit curing of the surfacing film, prolonging its useful shelf life. Backing films or papers may be applied to one or more surfaces of the surfacing film in order to inhibit the surfacing film from inadvertent attachment to surfaces prior to intended use.

Figure 2:
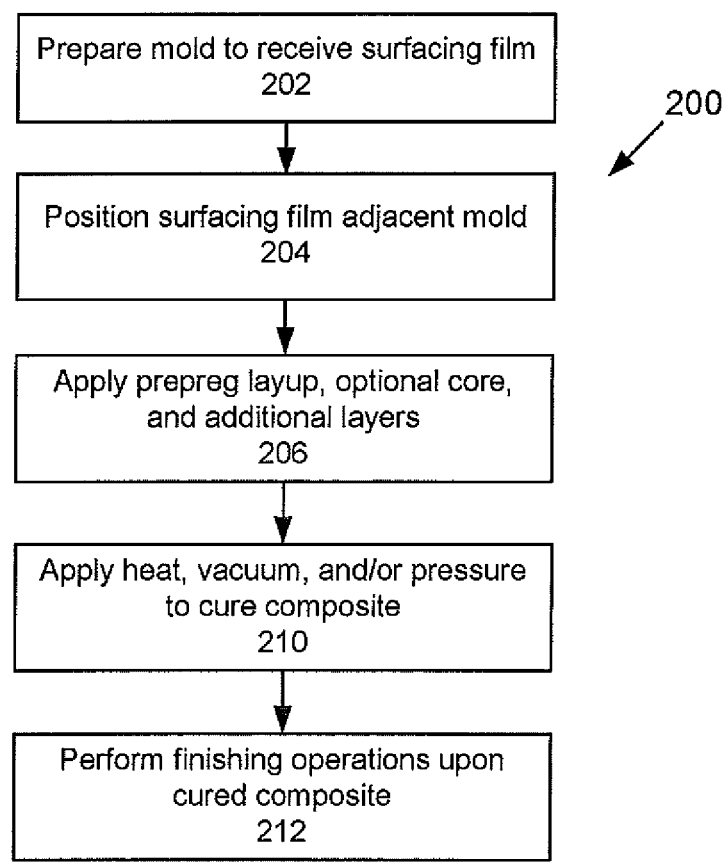
FIG. 2 is a flow diagram of an embodiment of a method of forming a composite from an embodiment of the electrically conductive thermosetting composition.
Figure 3:
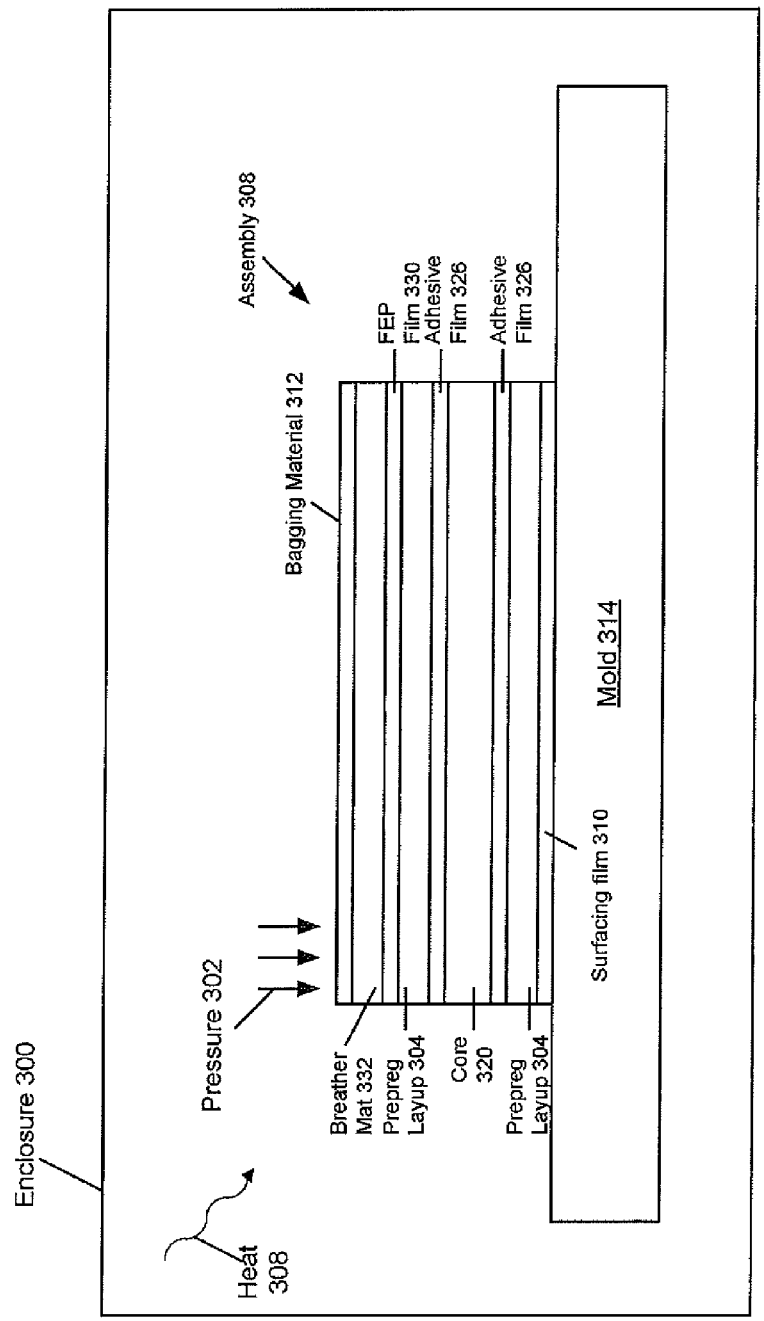
FIG. 3 is a schematic illustration a prepreg layup integrating a surfacing film formed from an embodiment of the electrically conductive thermosetting composition.

The surfacing films may be further integrated within a composite structure in block 116. This process is discussed below in greater detail with respect to FIGS. 2 and 3. FIG. 2 illustrates one embodiment of a method 200 of forming a composite including an embodiment of a surfacing film of the present disclosure. A corresponding schematic illustration of the composite is illustrated in FIG. 3.

In block 202, a mold or tool 314 (FIG. 3) may be prepared to receive the surfacing film 310 and a composite prepreg layup 304. The mold 314 may be configured with a selected shape and may further comprise texturing and/or other surface and through thickness features, as necessary. The prepreg layup 304 and/or surfacing film 310 may be placed in contact with at least a portion of the mold 314 such that the composite may be cured in the selected shape of the mold 314, as discussed below. Abrasives may be applied to the tool to remove surface debris and leave a substantially smooth surface. A mold release agent may be further applied to the mold 314 to facilitate removal of the composite part from the mold 314 after processing is completed.

In block 204, the surfacing film 310 is applied to the mold 314. The surfacing film 310 may be removed from cold storage and allowed to warm to approximately room temperature. The surfacing film 310 is then cut to desired shape and the backing film on the resin-rich side of the surfacing film 310 is removed. The exposed film is subsequently applied to the cleaned surface of the mold 314, with care taken that substantially no wrinkles or air bubbles are present in the surfacing film 310. Application of the surfacing film 310 in this manner may be accomplished by manual or automated mechanisms (e.g., automatic tape layup (ATL), automatic fiber placement (AFP)).

In block 206, the prepreg layup 304 may be co-cured with the surfacing film in order to incorporate the surfacing film 310 with the composite. In an embodiment, one or more prepreg layers may be assembled in a prepreg layup 304 that is placed adjacent the surfacing film 310. In alternative embodiments, the prepreg layup 304 may be assembled and subsequently placed adjacent the surfacing film 310. The prepregs may take the form of woven fabrics or tapes, as desired.

Optionally, one or more cores 320 may be interposed between layers of the prepreg layup 304 The cores may comprise foamed structures, honeycombed structures, and the like. An adhesive film 326 may be further interposed between the prepreg layup 304 and the core 320 in order to facilitate bonding of the core 320 to the prepreg layup 304.

An FEP film 330 may be further placed adjacent the surface of the prepreg layup 304 opposite the surfacing film 310. The FEP film 330 provides isolation and part release.

A breather mat 332 may be also placed adjacent the surface of the FEP film 330. The breather mat 332 acts to absorb at least a portion of excess resin from the prepreg layup 304. Although not shown, breather cloths, as known in the art, may also be added to the assembled structure.

The assembly 308 formed in this manner may be enclosed within a bagging material capable of supporting an applied vacuum and placed within an enclosure 300 for use in curing and/or consolidating prepreg layups with embodiments of the surfacing film 310. In certain embodiments, the enclosure 300 may be configured to provide heat 308, pressure 302, vacuum 316, and combinations thereof, such as ovens and autoclaves.

In embodiments where the assembly 308 is heated, the enclosure 300 may be heated to a temperature which ranges between about 180 to 350° F., preferably, about 250 to 350° F., depending upon the intended cure temperature of the prepreg resin used. In certain embodiments, the heating rate may range between about 1 to 5° F./min.

In further embodiments, the enclosure 300 may be capable of applying a vacuum to the assembly 308. For example, the bagging material 312 may form an approximately gas-tight region in communication with a vacuum source of the enclosure 300. The level of vacuum applied by the enclosure 300 may be varied or kept constant during curing and/or consolidation. For example, a vacuum ranging between about 40 to 50 psi or less may be applied to the assembly 308.

In further embodiments, the enclosure 300 may be capable of applying a pressure 302 on the assembly 308. The applied pressure 302 may be provided by a pressure source in communication with the enclosure 300. The applied pressure 302 may further be varied or kept constant during curing and/or consolidation. For example, a pressure ranging about 14 to 100 psi may be applied, depending upon the part design and structural integrity.

In block 210, finishing operations may be performed upon the surfacing film. In one example, a fine abrasive (e.g., about 240 to 320 grit) may be applied to the surfacing film in order to substantially remove any debris on the surface of the surfacing film 310 (e.g., mold release agent) and provide a selected degree of roughness or polish to the surface of the surfacing film 310. The surfaced composite structure may be overcoated with paint primer and topcoat enamel.

EXAMPLES

In the examples below, surfacing films formed from embodiments of the conductive thermosetting compositions of the present disclosure are discussed in detail. In particular, the conductivity and/or resistivity of surfacing films having various conductive additives, and the lighting strike protection performance they provide, are investigated and compared with that afforded by other systems. Notably, it is discovered that compositions containing silver flake, alone or in combination with other conductive additives, exhibit very low resistivity values, comparable to metals. These examples are discussed for illustrative purposes and should not be construed to limit the scope of the disclosed embodiments.

Example 1

Surfacing Film Preparation

Thermosetting conductive compositions for use in surfacing films were prepared from the components listed in Table 2 below. The compositions each comprised epoxy resins, elastomeric tougheners, non-conductive additives, flow control agents, UV stabilizers, solvents, and conductive additives. Each of trials 1-6 investigated the effect of a conductive additive upon the resistivity of the surfacing film.

TABLE 2

Surfacing Film Compositions

| Component | Concentration (wt. %) | | | | | | | |
|---|---|---|---|---|---|---|---|---|
| | Trial 1 | Trial 2 | Trial 3 | Trial 4 | Trial 5 | Trial 6 | Trial 7 | Trial 8 |
| Epoxy Resins | | | | | | | | |
| Diglycidylether of Bisphenol A (DER 331, Epon 828) | 12% | 12% | 12% | 12% | 12% | 12% | 12% | 12% |
| Tetraglycidylether methylenedianiline (MY 9655, 9634, 721) | 2% | 2% | 2% | 2% | 2% | 2% | 2% | 2% |

TABLE 2-continued

Surfacing Film Compositions

| Component | Concentration (wt. %) | | | | | | | |
|---|---|---|---|---|---|---|---|---|
| | Trial 1 | Trial 2 | Trial 3 | Trial 4 | Trial 5 | Trial 6 | Trial 7 | Trial 8 |
| Diglycidylether of Tetrabromo Bisphenol A (DER 542) | 8% | 8% | 8% | 8% | 8% | 8% | 8% | 8% |
| Toughening Agent | | | | | | | | |
| Nipol 1472 elastomer | 1.5% | 1.5% | 1.5% | 1.5% | 1.5% | 1.5% | 1.5% | 1.5% |
| CTBN or CTB elastomer | 1.5% | 1.5% | 1.5% | 1.5% | 1.5% | 1.5% | 1.5% | 1.5% |
| Curing agents | | | | | | | | |
| Bisureas (CA 150 or CA 152) | 1% | 1% | 1% | 1% | 1% | 1% | 1% | 1% |
| Dicy | 1% | 1% | 1% | 1% | 1% | 1% | 1% | 1% |
| Fillers | | | | | | | | |
| Ceramic microsphere (e.g. Zeeospheres) | 9% | 9% | 9% | 9% | 9% | 9% | 9% | 9% |
| Flow Control | | | | | | | | |
| Fumed silica | 1.50% | 1.50% | 1.50% | 1.50% | 1.50% | 1.50% | 1.50% | 1.50% |
| UV stabilizers additives | | | | | | | | |
| Butylated Hydroxytoluene (BHT) | 1% | 1% | 1% | 1% | 1% | 1% | 1% | 1% |
| 2-hydroxy-4-methoxy-benzophenone (UV-9) | 1% | 1% | 1% | 1% | 1% | 1% | 1% | 1% |
| Conductive Fillers | | | | | | | | |
| Silver Flake (AB 0022) | 56% | | | | | | | |
| Silver Flake (EA 0295) | | 56% | | | | | | |
| Silver-Coated Copper (50% Ag) | | | 56% | | | | | |
| Silver-Coated Aluminum (Conduct-O-Fil) | | | | 56% | | | | |
| Nickel-Coated Graphite | | | | | 56% | | | |
| Silver-Coated Nickel | | | | | | 56% | | |
| Carbon Black | | | | | | | 2.5-7.5% | |
| Carbon Nanofiber | | | | | | | | 4-16% |
| Surface Resistivity (mΩ) | 12.5 | 152 | 4950 | 4500 | 3100 | 6100 | 17,000-47,000 | 20,000-200000 |

Conductive surfacing films were prepared by addition of the components outlined above to a mixing vessel and mixing the components using a high-speed shear lab mixer. About 100 parts by weight of the epoxy resin, including an approximately 60:40:10 ratio of Diglycidylether of Bisphenol A (DER 331—Dow Chemical) to Tetraglycidylether methylenedianiline (MY9655—Huntsman) to Diglycidylether of Tetrabromo Bisphenol A (DER 542—Dow Chemical), was added to the mixing vessel and stirred for about 30 minutes at about 1000 rpm. MEK was added as a solvent with the epoxy resins to adjust the rheology and solid content of the composition, as necessary.

Subsequently, about 1.5 wt. % of elastomer tougheners Nipol 1472 (Zeon Chemical) and 1.5 wt. % of CTBN (or CTB) type elastomer (Hycar CTBN 1300X13—Noveon) were added to the epoxy resins. Conductive fillers were also added to the mixing vessel in a concentration of about 46-56 wt. %. About 10 wt. % ceramic microspheres (Zeeospheres G-200—3M.), about 2 wt. % of a flow control agent, amorphous fumed silica, and about 1% each of UV stabilizers BHT and 2-hydroxy-4-methoxy-benzophenone were further added to the mixing vessel. MEK solvent was added, as necessary, to control the viscosity of above mix to about 80 wt. % solids and the components of the composition were mixed for about 50-70 minutes at about 1000-3000 rpm. The temperature of the composition was kept below about 160° F. Additional MEK was added, as necessary, to inhibit the mixture from climbing the mixing shaft.

The mixture was subsequently cooled to below about 120° F. and about 1 wt. % latent curing agents dicyandiamide (Dicy) and Bisurea (based on toluenediamine (CA-150—Omicure U24) or CA 152—Omicure U-52—CVC Chemical) were each added to the composition. The composition was then mixed for about 5-10 minutes until approximately homogenous. The temperature of the mixture, during addition of the curing agents, was maintained below about 130° F.

To form surfacing films from the above compositions, each composition was strained, de-aired, and deposited as a film. Straining was performed through filtration media EP-15. De-airing was performed such that the solid content of the composition was about 80 wt. %. The strained and de-aired composition was then coated as a film having about 0.035 psf film weight by a film coater and then dried to less than about 1% by weight volatiles. A selected non-woven polyester or glass random mat carrier was pressed into film under light pressure to embed the mat to the film.

Composite parts incorporating the surfacing film were manufactured by incorporating the surfacing film onto a tool, followed by layup of a prepreg, according to the prepreg manufacturer's instructions. The composite part was then cured at a temperature between about 180° F. and 350° F., for about 60 to 180 minutes, e.g., about 90 to 120 minutes, depending upon the intended cure temperature of the prepreg system. During a cure under autoclave conditions, the composite parts were exposed to a pressure of about 14 to 100 psi, for about 60 to 180 minutes, depending upon the part design and structural density.

Example 2

Electrical Conductivity Measurements of Surfacing Films Comprising Varied Conductive Additive Cured surfacing films having 2 plies were cut to test coupons of about 6×5 inches and electrical conductivity or surface resistivity (in Ohm/square, or milliohm/square) was measured using a four-point probe AVO® Ducter® DLRO10X Digital Low Resistivity Ohmmeter. Surface resistivity was measured in accordance with the BMS10-21K specification (Boeing), with an approximately 4 inch distance between the probes.

Trial 1—Electrical Conductivity Measurements of Surfacing Films Comprising Silver Flake as Conductive Additive Silver flake (e.g. AB 0022 from Metalor Technologies, was employed as the conductive additive in the composition of trial 1. The particle size distribution of the AB 0022 silver flake is: about 13.4 μm ($D_{50}$), about 28.5 ($D_{90}$), and about 64.5 ($D_{100}$). The conductive surfacing film prepared from the composition was found to exhibit a resistivity of about 12.5 mΩ/sq.

Trial 2—Electrical Conductivity Measurements of Surfacing Films Comprising Silver Flake as Conductive Additive Silver flake (e.g. EA 0295—Metalor Technologies) was employed as the conductive additive in the composition of trial 2. The particle size distribution of the EA 0295 silver flake is: about 5.2 μm ($D_{50}$), about 13.34 ($D_{90}$), and about 32.5 ($D_{100}$), which is about half the size of the AB 0022 silver flake. The conductive surfacing film prepared from the composition was found to exhibit a resistivity of about 152 mΩ/sq.

Trial 3—Electrical Conductivity Measurements of Surfacing Films Comprising Silver-Coated Copper as Conductive Additive Silver-coated copper (Ferro) was employed as the conductive additive in the composition of trial 3. The silver-coated copper particles had a mean diameter of about 45 μm. The conductive surfacing film prepared from the composition was found to exhibit a resistivity of about 125 to 137 mΩ/sq.

Trial 4—Electrical Conductivity Measurements of Surfacing Films Comprising Silver-Coated Aluminum as Conductive Additive Silver-coated aluminum (AEE, Micron Metals, Inc.) was employed as the conductive additive in the composition of trial 4. The conductive surfacing film prepared from the composition was found to exhibit a resistivity of 4500 mΩ/sq.

Trial 5—Electrical Conductivity Measurements of Surfacing Films Comprising Nickel-Coated Graphite as Conductive Additive Nickel-coated graphite (AEE, Micron Metals, Inc.) was employed as the conductive additive in the composition of trial 5. The conductive surfacing film prepared from the composition was found to exhibit a resistivity of 3100 mΩ/sq.

Trial 6—Electrical Conductivity Measurements of Surfacing Films Comprising Silver-Coated Nickel as Conductive Additive Silver-coated nickel (AEE, Micron Metals, Inc.) was employed as the conductive additive in the composition of trial 6. The conductive surfacing film prepared from the composition was found to exhibit resistivity of less than about 6100 mΩ/sq.

Figure 5A:
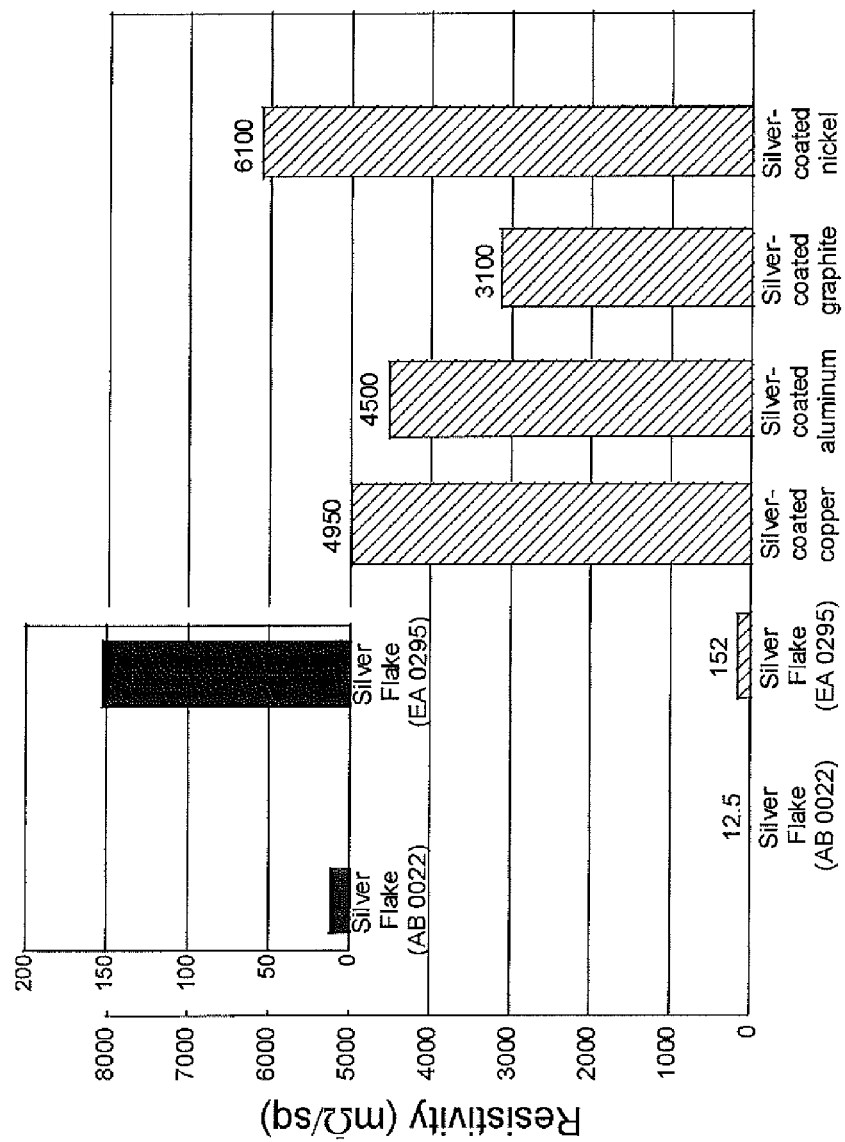
FIG. 5A is a plot of resistivity as a function of conductive additive for surfacing films formed from embodiments the electrically conductive thermosetting composition.
Figure 5B:
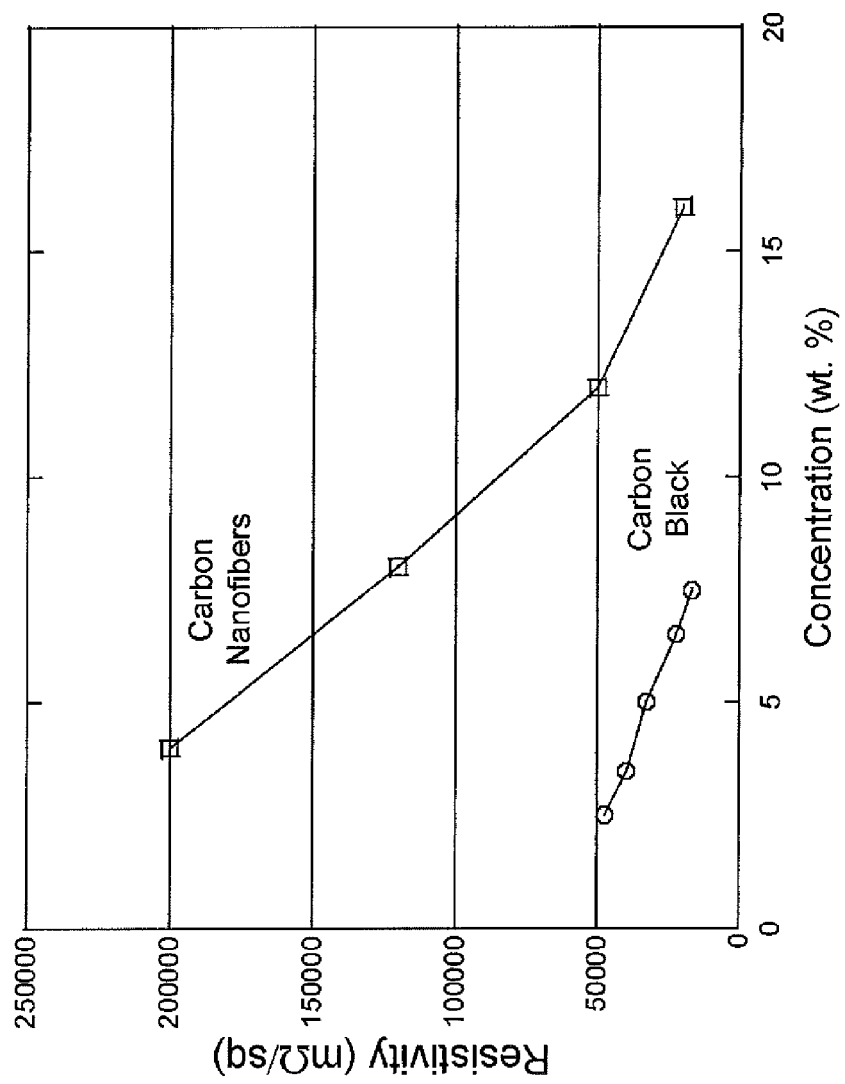
FIG. 5B is a plot of resistivity as a function of concentration for surfacing films formed from embodiments the electrically conductive thermosetting composition including conductive carbon black and carbon nanofibers.

Trial 7—Electrical Conductivity Measurements of Surfacing Films Comprising Carbon Black as Conductive Additive Conductive carbon black (Printex XE2—Degussa) was employed as the conductive additive in the composition of trial 7. Loading levels ranging from about 2.5 to 7.5 wt. % were examined. As illustrated in FIG. 5B, the conductive surfacing film prepared from the composition was found to exhibit resistivity between about 17,000 to 47,000 Ω/sq.

Trial 8—Electrical Conductivity Measurements of Surfacing Films Comprising Carbon Nanofibers as Conductive Additive Carbon nanofibers were employed as the conductive additive in the composition of trial 7. Loading levels ranging from about 4 to 16 wt. % were examined. As illustrated in FIG. 5B, the conductive surfacing film prepared from the composition was found to exhibit resistivity between about 20,000 to 200,000 Ω/sq.

Summary of Screening Study

Figure 6:
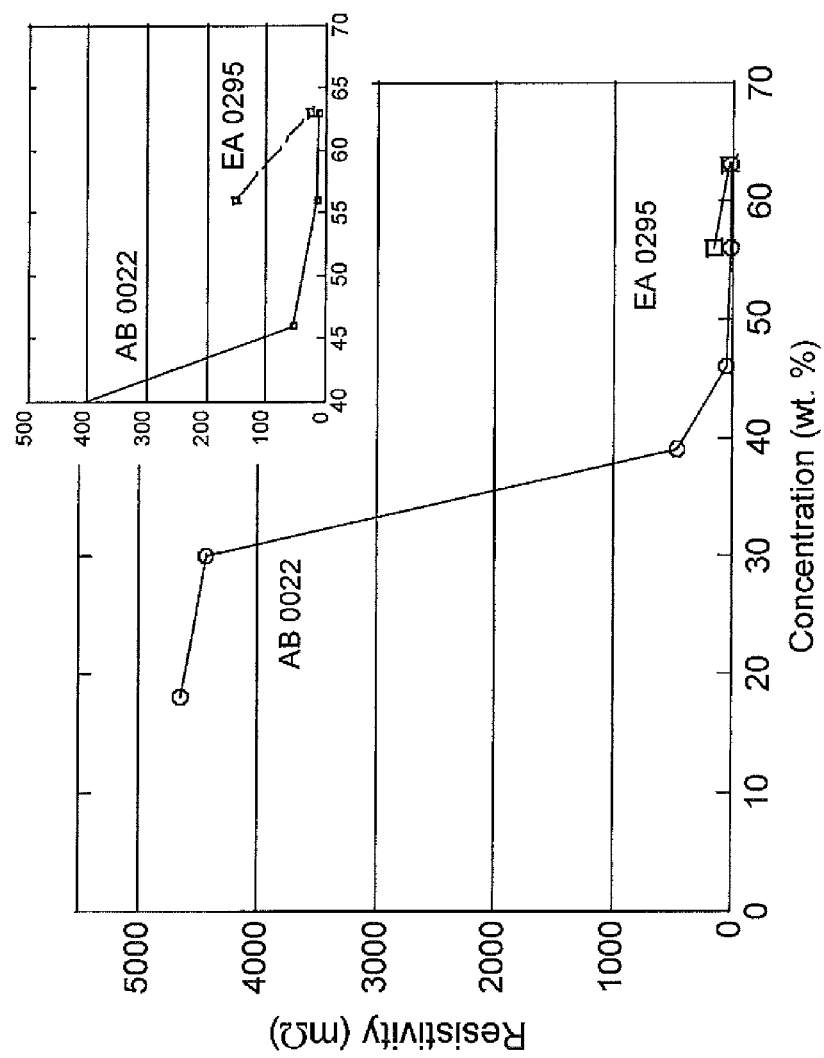
FIG. 6 is a plot of resistivity as a function of concentration of two different silver flakes for surfacing films formed from embodiments the electrically conductive thermosetting composition.

The resistivity measurements for each composition are summarized in FIG. 6. Notably, compositions including silver flake additives (e.g., trials 1 and 2) exhibited very low resistivity values, for the same level of conductive additive loading, as compared with other conductive additives (e.g., trials 4-8). These low resistivity values are comparable to, or better than, that of surfacing films incorporating copper metal careens, about 15 mOhm/sq. These compositions may find utility in surfacing films employed for lightning strike protection Trials 7 and 8, employing carbon black and carbon nanofibers, exhibited relatively high resistivity values, as compared to trials 1-6. These additives, while less suitable for surfacing films employed for lightning strike protection, may find utility in surfacing EMI shielding and ESD applications.

Example 2

Effect of Silver Flake Type and Loading on Electrical Conductivity of Surfacing Films As shown in Example 1, conductive additives comprising silver flakes were found to provide embodiments of the surfacing film with very low electrical resistivity. In order to better understand the effect of silver flake on electrical properties, a systematic study of electrical conductivity as a function of loading for three different silver flake types (AB 0022 and EA 0295) and a silver-copper flake was performed. The compositions were otherwise as discussed above, The electrical conductivity results obtained are summarized in the following Table 3.

TABLE 3

Effect of Silver Flake Type and Loading on Electrical Conductivity of Surfacing Films

| SILVER FLAKE TYPE | METAL FLAKE CHARACTERISTICS | LOADING LEVEL (WT. %) | ELECTRICAL CONDUCTIVITY [SR; MILLI-OHM/SQ] |
|---|---|---|---|
| Trial 9 Silver Flake (AB 0022) | Particle size (μm): $D_5 = 5.0$, $D_{50} = 13.4$, $D_{90} = 28.5$ Tap Density = 2.2 g/cm³; Apparent Density = 1.5 g/cm³; Surface Area = 0.63 m²/g | 18% 30% 39% 46% 56% 63% | 4640 4430 462 53 13 10 |
| Trial 10 Silver Flake (EA 0295) | Particle size (μm): $D_5 = 1.5$, $D_{50} = 5.2$, $D_{90} = 13.3$ μm Tap Density = 4.3 g/cm³; Apparent Density = 2.4 g/cm³; Surface Area = 0.53 m²/g | 56% 63% | 152 27 |

As shown in Table 3 and FIG. 6, resistivity of the surfacing film decreases significantly with increasing concentration of silver flake. For example, the resistivity of surfacing film compositions comprising AB 0022 silver flake decreased from about 4640 mΩ at about 18 wt. % loading to about 12.5 mΩ at about 56 wt. % loading, to about 10 mΩ at about 63 wt. % loading. Similarly, the resistivity of surfacing film compositions comprising EA 0295 silver flake decreased from about 152 to 27 mΩ as the silver flake concentration increased from about 56 to 63 wt. % loading.

Furthermore, at equivalent loading levels, the AB 0022 silver flake was found to exhibit lower conductivity values than those of EA 0295. Without being bound by theory, this observation may be explained by the particle size distribution and the surface area difference of the two flakes. The AB 0022 silver flake exhibits a larger particle size distribution than EA 0295, which may allow for greater packing efficiency, which facilitates contact between the silver flakes It may also be observed that there is a pronounced decrease in the resistivity of the composition when the concentration of silver flake AB 0022 exceeded about 40 wt. %. As discussed below, this result is believed to be due to the formation of a substantially continuous, interconnected, lamellar network of silver flakes. These results further suggest that, in certain embodiments, the concentration of silver flake within the composition may exceed about 40 wt. %. In other preferred embodiments, the concentration of silver flake may exceed about 46% so as to provide surfacing films having resistivity levels comparable to metals.

Example 4

Surfacing Film Microstructure Study Using SEM

The microstructure of composite surfacing films containing silver flake (AB 0022) was further examined to better understand the role of the silver flake in the conductivity of the surfacing film. The composites were fabricated per Boeing BMS 8-341 specification for surfacing films. In order to examine the microstructure of the composite laminates prepared in this manner, samples were cut into small size, about 10 mm×20 mm, and mounted in an epoxicure resin system. The surface for examination was polished in a sequence of diminished abrasive size, about 320 grit/about 1200 grit/about 0.3 μm alumina slurry/about 0.05 μm alumina slurry, using a Buehler Metasery 2000 grinder/polishing machine. For examination of the film microstructure, the surface was coated with platinum and analyzed using a Hitachi S-2700 Scanning Electron Microscope (SEM), as illustrate in FIG. 4

SEM examination on those highly conductive surfacing films reveals the formation of a continuously inter-connected lamellar conductive path structure comprised of randomly dispersed fine silver flakes in the epoxy matrix (light regions, FIG. 4A). This conductive path is believed to be responsible for the substantially uniform, high conductivity of these conductive surfacing films. The large flake size, up to about 30 μm, and relative large surface area of silver flake AB 0022 provide sufficient surface area contact for continuous, good electrical conductivity throughout the matrix. In the matrix, the metal flakes pack closely to one another in a substantially parallel orientation, facilitating the passage of electrons.

Example 6

Surfacing Film Compositions Incorporating Silver Flakes and Other Conductive Additives Due to the high conductivity measured in embodiments of the composition containing silver flake, further conductivity studies were performed to examine the performance of silver flake in combination with other conductive additives for further conductivity enhancement of the surfacing film composition. With the exception of the new conductive additives, these compositions were approximately unchanged from those discussed above with respect to Table 1. Table 4 summarizes the conductive additives containing silver flake and other conductive additives: silver flake alone (baseline), silver flake and silver nanowires, silver flake and carbon nanotubes, and silver flake and silver-coated glass balloons.

TABLE 4

Silver flake containing surfacing film compositions

| SILVER FLAKE TYPE | SILVER CONC. (WT. %) | OTHER ADDITIVE CONC. (WT. %) | SURFACE RESISTIVITY (MΩ/SQ) |
|---|---|---|---|
| Trial 11 Silver Flake (AB 0022) | 18% | | 4640 |
| | 30% | | 4430 |
| | 39% | | 462 |
| | 46% | | 53 |
| | 56% | | 13 |
| | 63% | | 10 |
| Trial 12 Silver Flake and | 46% | 3% | 15 |
| | 51% | 3% | 5 |

TABLE 4-continued

Silver flake containing surfacing film compositions

| SILVER FLAKE TYPE | SILVER CONC. (WT. %) | OTHER ADDITIVE CONC. (WT. %) | SURFACE RESISTIVITY (MΩ/SQ) |
|---|---|---|---|
| silver nanowires (SF + SNW) | 56% | 3% | 0.2 |
| Trial 13 | 51% | 0.3% | 50 |
| Silver Flake and carbon nanotubes (SF + CNT) | 56% | 0.7% | 20 |
|  | 56% | 1.2% | 15 |
| Trial 14 | 51% | 5% | 60 |
| Silver Flake/and silver-coated glass balloons (SF + B) | 56% | 5% | 20 |

Trial 12—Electrical Conductivity Measurements of Surfacing Films Comprising Silver Flake and Silver Nanowires (SNW) as Conductive Additives Silver flake (AB 0022) and silver nanowires (SNW-A30, SNW-A60, SNW-A300, SNW-A900, —Filigree Nanotech, Inc.) were employed as the conductive additives in the composition of trial 9. The length and diameter of the silver nanowires was about 1 to 25 μm and 30 to 900 nm, depending upon the size and type of SNW selected. The concentration of silver nanowires was further kept constant at about 3 wt.%, while the concentration of silver flake was varied between about 46 to 56 wt. %. It was observed that the resistivity of the composition decreased significantly with increasing silver flake content, from about 15 mΩ/sq at a concentration of about 46 wt. % to about 0.2 mΩ/sq at a concentration of about 56 wt. %.

Trial 13—Electrical Conductivity Measurements of Surfacing Films Comprising Silver Flake and Carbon Nanotubes as Conductive Additives Silver flake (e.g., AB 0022) and carbon nanotubes (CNT/epoxy concentrate NP-W1M2, NP-A1M2, NP-A3M2, or NP-A2M2 from Nanoledge) were employed as the conductive additives in the composition of trial 10. The length and diameter of the CNTS varied, depending upon the CNT employed. The concentration silver flake and CNTs were each varied in trial 10, with the CNT concentration varying between about 0.3 to 1.2 wt. %, while the concentration of silver flake was varied between about 51 to 56 wt. %. It was observed that the resistivity of the composition decreased with increasing silver flake content, from about 50 mΩ/sq at a concentration of about 51 wt. % to about 15 mΩ/sq at a concentration of about 56 wt. %.

Trial 14—Electrical Conductivity Measurements of Surfacing Films Comprising Silver Flake and Silver-Coated Glass Balloons as Conductive Additives Silver flake (e.g., AB 0022) and silver-coated glass balloons (CNT/epoxy concentrate NP-W1M2, NP-A1M2, NP-A3M2, or NP-A2M2 from Nanoledge) were employed as the conductive additives in the composition of trial 11. The concentration of silver-coated glass balloons was further kept constant at about 5 wt. %, while the concentration of silver flake was varied between about 51 to 56 wt. %. It was observed that the resistivity of the composition decreased with increasing silver flake content, from about 60 mΩ/sq at a concentration of about 51 wt. % to about 15 mΩ/sq at a concentration of about 20 wt. %.

Summary of Compositions Containing Silver Flake and Other Conductive Additives

Figure 7:
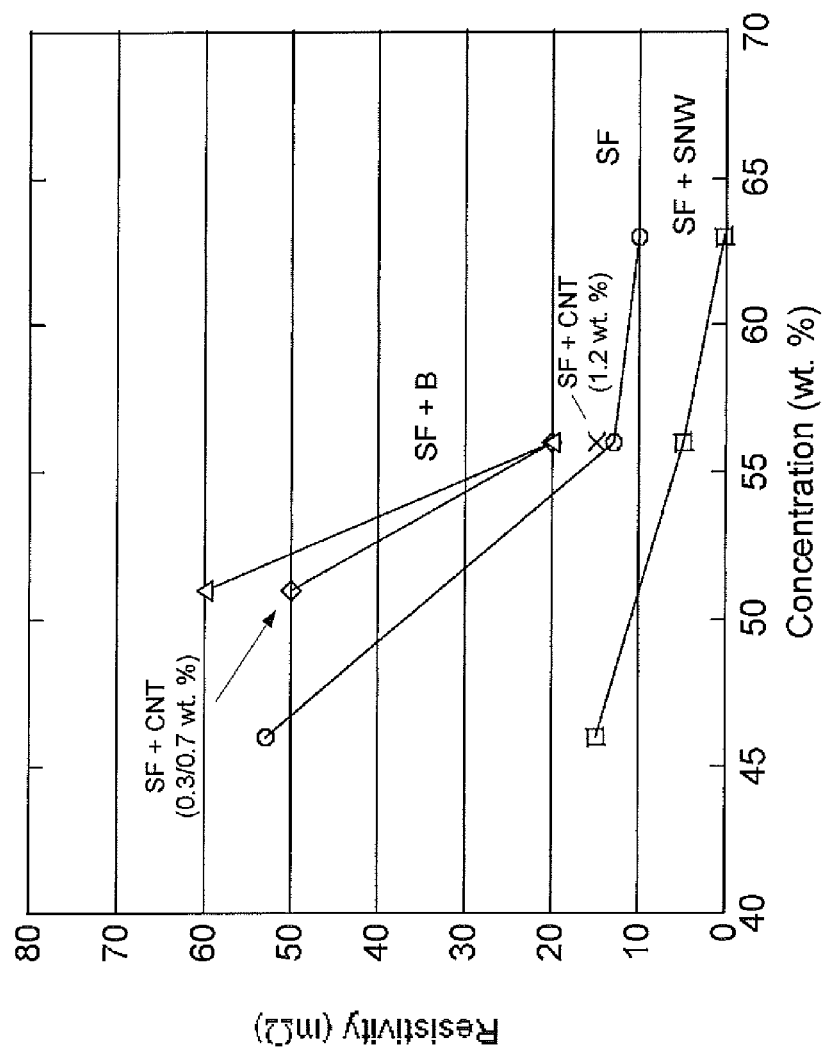
FIG. 7 is a plot of resistivity as a function of concentration of silver flakes, along and with other conductive additives (Silver Nanowire, Carbon Nanotubes, and meta-coated balloons) for surfacing films formed from embodiments the electrically conductive thermosetting composition.

The resistivity measurements for each composition are compared in against one another in FIG. 7. In one aspect, the silver flake containing compositions each exhibited decreasing resistivity with increasing silver flake concentration. Further comparing the performance of the compositions against one another, the compositions including silver flake and silver nanowires exhibited the best performance, followed by silver flake alone and silver flake and CNTs (1.2 wt. % loading) on the basis of lowest resistivity for a given silver flake loading. Furthermore, the resistivity of the surfacing film compositions does not exceed about 60 mΩ/sq, which is still comparable to that of metals.

Example 7

Lightning Strike Protection

The high, metal-like conductivity exhibited in embodiments of the surfacing films disclosed herein, achieved without using metal screens or foils, make them suitable for use in lightning strike protection (LSP) applications. To evaluate the performance of these surfacing films for LSP of composites, lightning strike testing was performed on composites incorporating surfacing films formed from conductive compositions including silver flake (e.g., composition of trial 1) in loadings ranging between about 56-63 wt. %. The performance of this system for LSP was compared to that of a control including the same composite and a surfacing film comprising a metal screen embedded within a polymer composition, Composite testing panels were fabricated with between 6 to 9 plies of prepregs in a multi-angle layup, as discussed above, with the conductive surfacing films as the outermost layer. The layups and surfacing films were then co-cured in an autoclave to incorporate the surfacing films within the composites. The panels were further overcoated with a paint primer and enamel top coat prior to lightning strike testing.

Lightning direct effect tests were employed to evaluate the performance of composites used within different zones of aircraft. The lightning strike tests are performed in accordance with RTCA/DO-160F, "Environmental Conditions and Test Procedures for Airborne Equipment" of the Radio Technical Commission for Aeronautics. In brief, a surfacing film/laminate panel is secured in place, and placed in electrical contact with current return elements. An electrode is positioned at about the center and adjacent the test panel. An initiating wire is extended from the electrode to the incipient lightning strike point on the sample surface.

Tests were conducted to simulate a lightning strike upon Zone 1A of an aircraft, the radome, and Zone 2A of an aircraft, most of the fuselage sections. The tests simulate lighting strikes by subjecting the test panels to high current test waveforms described below in Table 5. As shown in Table 5, the applied waveform may include a number of components, which vary depending upon the section of the aircraft the panel is intended to represent.

TABLE 5

| | Waveforms Employed in LSP Testing | | | | |
|---|---|---|---|---|---|
| Waveform | Peak Current Amplitude [kA] | Average Current Amplitude [kA] | Action Integral [$A^2s$] | Charge Transfer [C] | Zone Applied |
| Component A | 200 +/− 20 | | $2 \times 10^6$ +/− $0.4 \times 10^6$ | | 1A |
| Component B | | 2 +/− 0.4 | | 10 +/− 0.1 | 1A 2A |
| Component C | | ≥0.4 | | 18 +/− 3.6 | 1A 2A |
| Component D | 100 +/− 10 | | $0.25 \times 10^6$ +/− $0.05 \times 10^6$ | | 2A |

Figure 8:
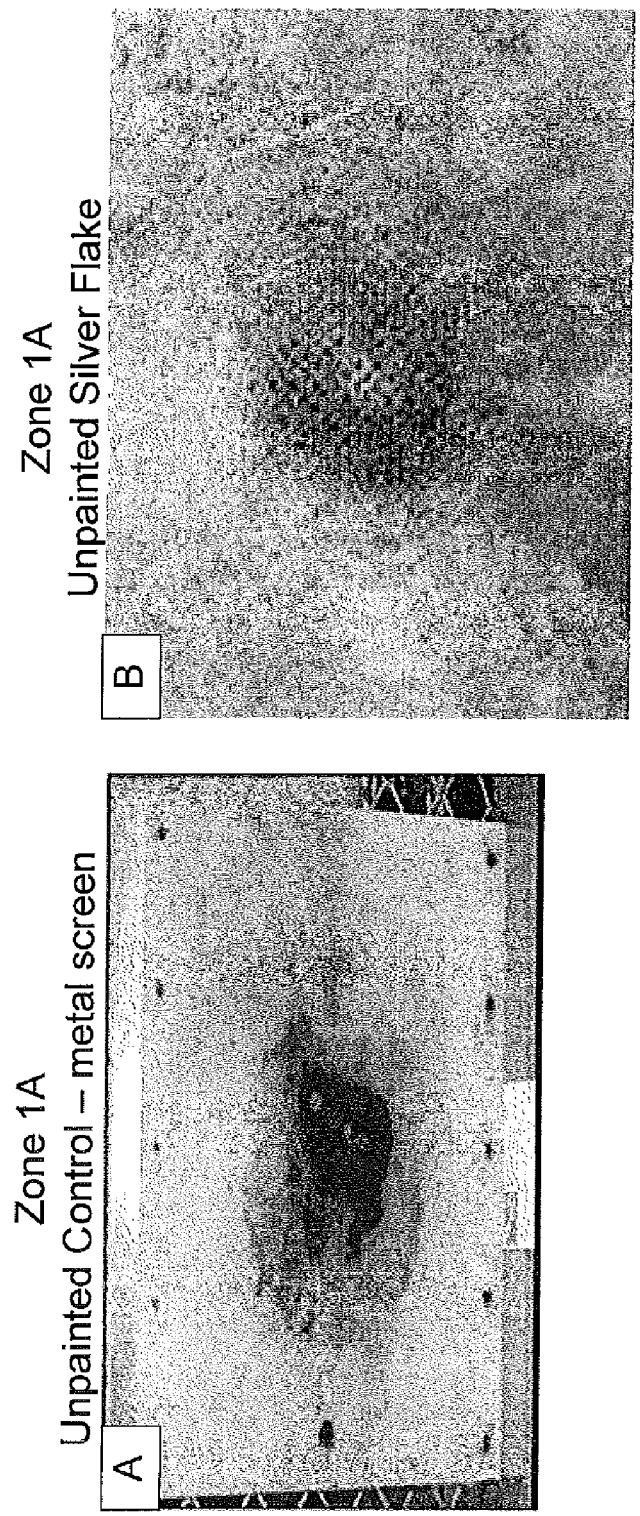
FIGS. 8A-8B are front-view pictures of composite panels incorporating surfacing films after Zone 1A lightning strike testing; (A) unpainted control surfacing film; (B) unpainted surfacing film containing silver flake.
Figure 9:
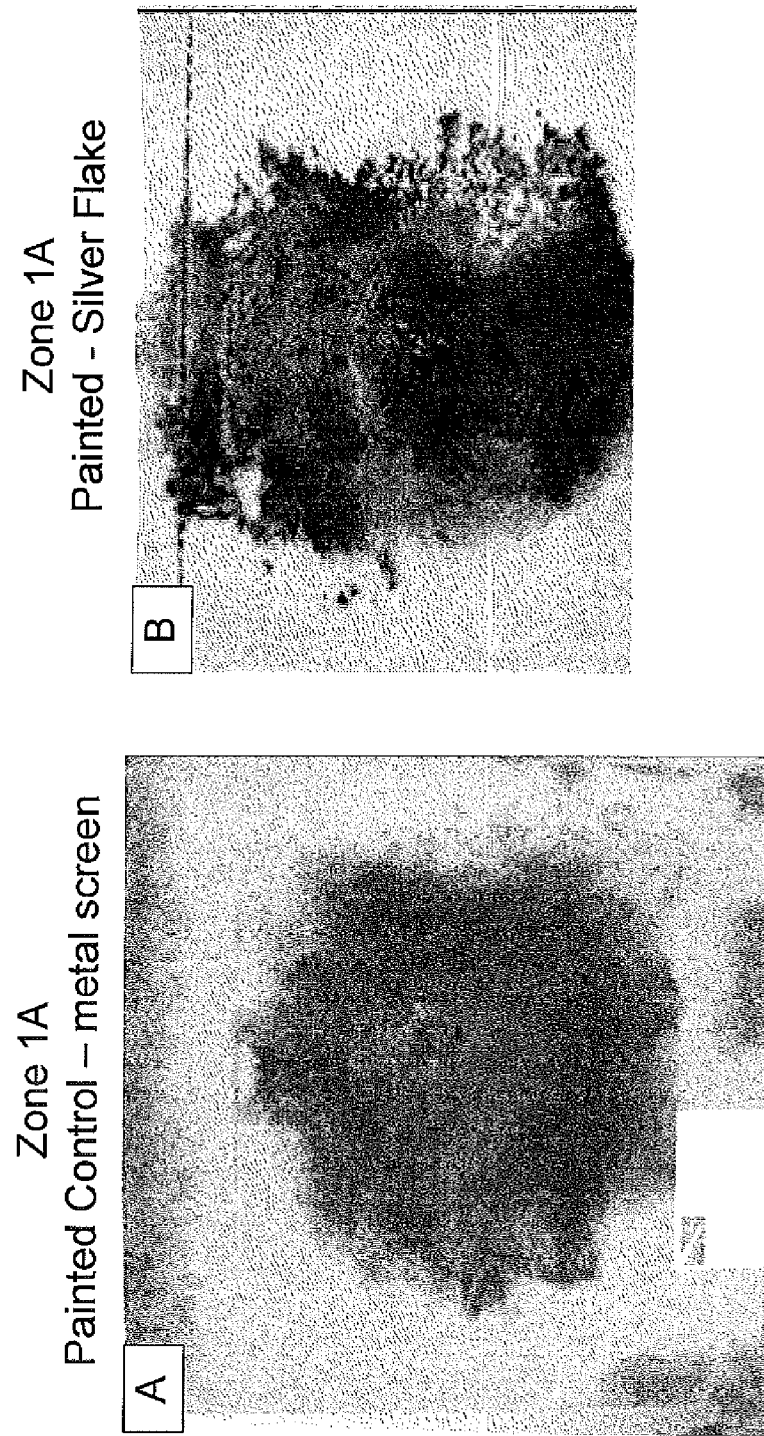
FIGS. 9A-9B are front-view pictures of composite panels incorporating surfacing films after Zone 1A lightning strike testing; (A) painted control surfacing film; (B) painted surfacing film containing silver flake.
Figure 10:
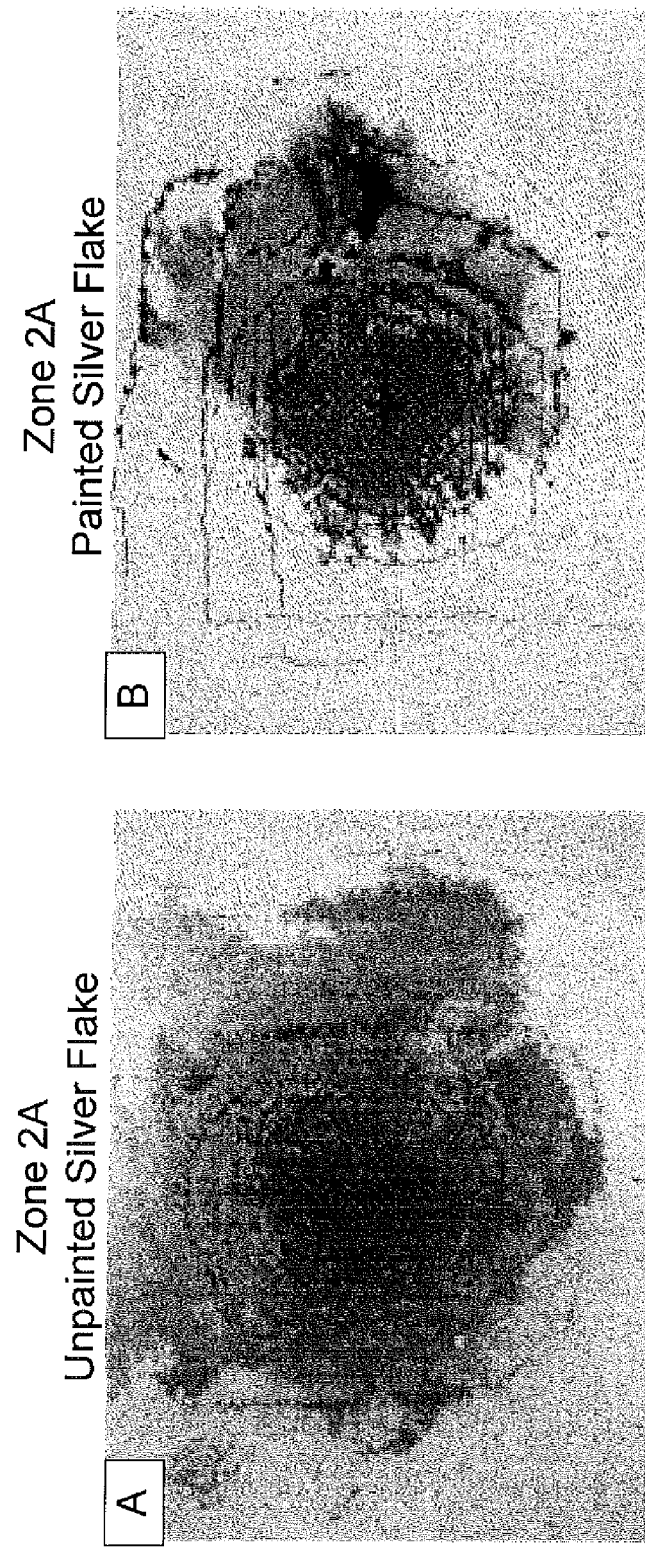
FIGS. 10A-10B are front-view pictures of composite panels incorporating surfacing films after Zone 2A lightning strike testing; (A) unpainted surfacing film containing silver flake; (B) painted surfacing film containing silver flake.

For example, a test simulating a Zone 1A strike would employ a waveform including Components A, B, and C, while a test simulating a Zone 2A strike would employ a waveform including Components B, C, and D FIGS. 8A-8B illustrate unpainted composite panels incorporating the control surfacing film embedded with copper screen and an embodiment of a silver flake containing surfacing film of the present disclosure after lighting strike testing simulating Zone 1A, respectively. FIGS. 9A-9B illustrate the Zone 1A performance of similar composite panels tested when painted prior to testing. FIGS. 10A-10B illustrate painted and unpainted composite panels incorporating an embodiment of a silver flake containing surfacing film of the present disclosure after lighting strike testing simulating Zone 2A, respectively In general, the silver flake containing surfacing film/composite laminate panels exhibited comparable lighting strike protection to performance of the control panel having a metal copper screen, with no evidence of punch through. Furthermore, surface damage was very limited.

The surface damage observed for the painted and unpainted test panels was varied, ranging from mesh burns, speckling of surface and delamination of surface layer, to broken fibers. For the same surfacing film/composite configuration, the painted panels generally exhibited more damage than the unpainted panels. This difference is due to the reduction in number of arc dispersion sites and concentration of stroke in local areas in the painted panels.

These results indicate that embodiments of the silver flake containing surfacing film/composite laminate panels possess significant lighting strike protection functionality and passed the lighting direct effect test in both zone 1A and 2A. Beneficially the surfacing film/composite laminate panels show comparable LSP to a control panel with a metal screen, affording comparable LSP with a weight savings of up to around 50%.

Example 8

Adhesive Testing

Embodiments of the thermosetting conductive compositions were also subjected to testing to evaluate their performance in adhesive applications. The tests performed included wide area lap shear strength testing and floating roller peel strength testing.

Lap shear testing provides information regarding the shear strength of an adhesive when the adherends bonded by the adhesive are loaded in tension. Wide area lap shear testing was performed in accordance with ASTM 3165, "Standard Test Method for Strength Properties of Adhesives in Shear by Tension Loading of Single-Lap-Joint Laminated Assemblies" at about room temperature, 180° F., and 250° F.

Floating roller peel testing provides information regarding the strength of an adhesive when one adherend is flexible and peeled at approximately constant angle from another adherend which is rigid. Floating roller peel testing was performed in accordance with ASTM D3167, "Standard Test Method for Floating Roller Peel Resistance of Adhesives at about room temperature, 225° F., and 250° F.

The composition of Trial 1, employing silver flake in a concentration of about 42 wt. % was evaluated. The composition, as described above, was mixed, de-aired, and subsequently coated as a hot melt film with about 0.06 psf film weight. A non-woven, random mat carrier was pressed into the film under light pressure to adhere the mat to the film. Conductive compositions were combined with either non-woven carbon veil, or aluminum screen.

A control sample was prepared with the same composition in a similar manner, with the exception that the conductive additive was omitted. The control sample further included the aluminum screen. The testing results for each adhesive are illustrated below in Table 6.

TABLE 6

| | Adhesive performance of conductive compositions | | |
|---|---|---|---|
| | Trial 15 Conductive Adhesive | Trial 16 Conductive Adhesive | Trial 17 Control adhesive |
| Adhesive Carrier | 0.06 psf Carbon mat | 0.06 psf 0.016 Al screen | 0.06 psf 0.016 Al screen |
| Wide Area Lap Shear (psi, RT) | 3074 | 3318 | 4375 |
| Wide Area Lap Shear (psi, 180° F.) | 3286 | 3714 | 4813 |
| Wide Area Lap Shear (psi, 250° F.) | 3000 | 3078 | 4130 |
| Floating Roller Peel (pli, RT) | 26 | 26 | 23 |
| Floating Roller Peel (pli, 225° F.) | 26 | 26 | Not tested |
| Floating Roller Peel (pli, 250° F.) | 27 | 27 | Not tested |
| Resistivity (mΩ/sq) | 250 | 250 | High (non-conductive) |

Trial 15—Adhesive Property Measurements of Adhesive Film Comprising Silver Flake as Conductive Additive on Carbon Mat Examining the results of Table 6, it may be observed that the adhesive strength of the composition of trial 15, as measured by wide area lap shear and floating roller peel, is approximately constant over the temperature ranges studied. In one example, over a temperature range of more than 200° F., from about room temperature to about 250° F., the lap shear strength only varies about 10%, between about 3000 and 3286 psi. Over approximately that same temperature, peel strength varies less than 5%, between about 26 to 27 pli.

Trial 16—Adhesive Property Measurements of Adhesive Film Comprising Silver Flake as Conductive Additive on Aluminum Screen Examining the results of Table 6, it may be observed that the adhesive strength of the composition of trial 16, as measured by wide area lap shear and floating roller peel, shows modest variation over the temperature ranges studied. In one example, from about room temperature to about 250° F., the lap shear strength varies about 20%, between about 3078 to 3714 psi. Over approximately that same temperature, peel strength varies less than about 5 pli.

Trial 17—Adhesive Property Measurements of Control Adhesive Film on Aluminum Screen Examining the Results of Table 6, it May be Observed that the Adhesive strength of the composition of trial 17, as measured by wide area lap shear and floating roller peel, shows modest variation over the temperature ranges studied. In one example, from about room temperature to about 250° F., the lap shear strength varies about 20%, between about 4130 to 4813 psi. Over approximately that same temperature, peel strength varies.

Summary—Adhesive Testing

Comparing the results of Trials 12-14, the silver flake containing conductive adhesives of Trials 15-16 exhibited both good conductivity, about 250 mΩ/sq and good adhesive properties, as measured by lap shear strength and peel strength. Notably, the adhesive properties are comparable to that of the non-conductive control adhesive, indicating that conductivity may be achieved with the composition without sacrificing adhesive strength. These results further demonstrate the potential suitability of the conductive adhesives for certain aerospace EME applications, such as LS surface repair, as path for return current, or conductive fasteners to reduce capacitive potentials.

Although the foregoing description has shown, described, and pointed out the fundamental novel features of the present teachings, it will be understood that various omissions, substitutions, changes, and/or additions in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A composite structure comprising an electrically conductive surfacing film formed on a composite substrate,
   wherein the surfacing film is capable of providing lightning strike protection and electromagnetic interference shielding, has an electrical resistivity of less than 500 mΩ/sq, a film weight in the range of 0.01-0.15 psf (pounds per square foot), and is formed from a curable thermosetting composition comprising:
   a. at least one multifunctional epoxy resin;
   b. at least one curing agent selected from the group consisting of: aromatic primary amines, bisureas, boron trifluoride complexes, and dicyandiamide;
   c. at least one toughening agent having a functional group selected from epoxy groups, carboxylic acid groups, amino groups and hydroxyl groups capable of reacting with other components of the composition;
   d. non-conductive fillers;
   e. conductive additives in an amount greater than about 35 wt. %, based on the total weight of the composition.

2. The composite structure of claim 1, wherein the composite substrate is a prepreg layup comprising a plurality of prepreg layers, each of said prepreg layers comprising reinforcing fibers impregnated with a matrix resin.

3. The composite structure of claim 1, wherein said at least one multifunctional epoxy resin comprises a combination of Diglycidylether of Bisphenol A and at least one of Tetraglycidylether methylenedianiline and Diglycidylether of Tetrabromo Bisphenol A.

4. The composite structure of claim 1, wherein said at least one curing agent is selected from the group consisting of: dicyandiamide, Bisureas, 4,4'-Methylene bis-(phenyl dimethylurea), 4,4'-diaminodiphenyl sulfone (4,4'-DDS), and $BF_3$.

5. The composite structure of claim 1, wherein said thermosetting composition further comprises non-conductive fillers.

6. The composite structure of claim 1, wherein said non-conductive fillers comprise ceramic microspheres.

7. The composite structure of claim 1, wherein said at least one toughening agent is selected from the group consisting of: carboxylated nitriles, carboxyl-terminated butadiene acrylonitrile (CTBN), carboxyl-terminated polybutadiene (CTB), polyether sulfone, polyether ether ketone (PEEK), polyetherketoneketone (PEKK), liquid rubber, and core/shell rubber particles.

8. The composite structure of claim 1, wherein said thermosetting composition further comprises ceramic microspheres and fumed silica, and
   said at least one multifunctional epoxy resin comprises a combination of Diglycidylether of Bisphenol A, Tetraglycidylether methylenedianiline, and Diglycidylether of Tetrabromo Bisphenol A,
   said at least one curing agent comprises dicyandiamide and bisureas, and
   said at least one toughening agent comprises carboxylated nitrile and either carboxyl-terminated butadiene acrylonitrile (CTBN) or carboxyl-terminated polybutadiene (CTB).

9. The composite structure of claim 1, wherein said curable thermosetting composition further comprises a chain extension agent selected from the group consisting of: bisphenol A, tetrabromo bisphenol A (TBBA), bisphenol Z, tetramethyl bisphenol A (TMBP-A), and bisphenol fluorines.

10. The composite structure of claim 1, wherein said thermosetting composition further comprises a UV stabilizer selected from the group consisting of: butylated hydroxytoluene (BHT), 2-hydroxy-4-methoxy-benzophenone, 2,4-Bis(2, 4-dimethylphenyl)-6-(2-hydroxy-4-octyloxyphenyl)-1,3,5-triazine, 3,5-Di-tert-butyl-4-hydroxybenzoic acid, n-hexadecyl ester, titanium dioxide, ultra-fine zinc oxide, and carbon black.

11. An electrically conductive surfacing film capable of providing lightning strike protection and electromagnetic interference shielding, said surfacing film comprising silver flakes distributed substantially uniformly throughout the film in a substantially interconnected, lamellar configuration, and formed from a curable thermosetting composition comprising:
   a. at least one multifunctional epoxy resin;
   b. at least one curing agent selected from the group consisting of: aromatic primary amines, bisureas, boron trifluoride complexes, and dicyandiamide;

c. at least one toughening agent having a functional groups selected from epoxy groups, carboxylic acid groups, amino groups and hydroxyl groups capable of reacting with other components of the composition; and d. silver flakes in an amount greater than about 35 wt. %, based on the total weight of the composition;

e. ceramic microspheres; and f. fumed silica, wherein said surfacing film has an electrical resistivity of less than 500 mΩ/sq, a film weight in the range of 0.01-0.15 psf (pounds per square foot), and less than about 1 wt. % of volatile content.

12. The electrically conductive surfacing film of claim 11, wherein the curable thermosetting composition comprises:

a. a combination of Diglycidylether of Bisphenol A and at least one of Tetraglycidylether methylenedianiline and Diglycidylether of Tetrabromo Bisphenol A;

b. at least one curing agent selected from the group consisting of: dicyandiamide, bisureas, 4,4'-diaminodiphenyl sulfone (4,4-DDS), and $BF_3$;

c. at least one toughening agent selected from the group consisting of: carboxylated nitriles, carboxyl-terminated butadiene acrylonitrile (CTBN), carboxyl-terminated polybutadiene (CTB), polyether sulfone, and core/shell rubber particles; and d. silver flakes in an amount greater than about 35 wt. %, based on the total weight of the composition;

e. ceramic microspheres; and f. fumed silica.

* * * * *